US012746428B2

(12) United States Patent
Coulter et al.

(10) Patent No.: US 12,746,428 B2
(45) Date of Patent: Sep. 29, 2026

(54) SELECTABLE CLAMP FOR INTERCHANGING WEIGHTLIFTING HANDLEBARS IN AN ADJUSTABLE WEIGHT SET

(71) Applicant: Dick's Sporting Goods, Inc., Coraopolis, PA (US)

(72) Inventors: Derek Coulter, Coraopolis, PA (US); Tyler L. Crow, Bethel Park, PA (US); Lucas Ferrari, Clinton, PA (US)

(73) Assignee: Dick's Sporting Goods, Inc., Coraopolis, PA (US)

( * ) Notice: Subject to any disclaimer, the term of this patent is extended or adjusted under 35 U.S.C. 154(b) by 262 days.

(21) Appl. No.: 18/213,618

(22) Filed: Jun. 23, 2023

(65) Prior Publication Data

US 2024/0424336 A1 Dec. 26, 2024

(51) Int. Cl.
*A63B 21/075* (2006.01)
*A63B 21/072* (2006.01)
*F16B 2/10* (2006.01)

(52) U.S. Cl.
CPC ........ *A63B 21/075* (2013.01); *A63B 21/0724* (2013.01); *F16B 2/10* (2013.01)

(58) Field of Classification Search
CPC .............. A63B 21/072; A63B 21/0724; A63B 21/0728; A63B 21/075; A63B 71/0036; F16B 2/10; F16B 2/185
See application file for complete search history.

(56) References Cited

U.S. PATENT DOCUMENTS 4,639,979 A * 2/1987 Polson .................. F16B 7/1418 285/373
D290,485 S 6/1987 Suponitsky
(Continued)

FOREIGN PATENT DOCUMENTS

CN 115607903 A 1/2023
WO WO-2008/071029 A1 6/2008
(Continued)

OTHER PUBLICATIONS

Globalbees Brands Pvt. Ltd, "Reach Carbon Adjustable Dumbbells (2.2 kg to 11 kg) Pefect Home Gym Equipment for Fitness and Full Body Workout Easy Weight Adjustment with Pin Lock Technology Space Saver Dumbbell Suitable for Men and Women," retrieved from https://reach2fitness.com/products/reach-carbon-adjustable-dumbbells-22-kg-to-11-kg-1000000008694, Apr. 14, 2024, 4 pgs.
(Continued)

*Primary Examiner* — Joshua Lee
(74) *Attorney, Agent, or Firm* — Foley & Lardner LLP

(57) ABSTRACT

A selectable clamp for interchanging weightlifting handlebars in an adjustable weight set includes a first clamp plate set, a second clamp plate set, and a latch. The first clamp plate set and the second clamp plate set are pivotally moveable relative to one another and define an expandable opening therebetween. The clamp plate sets engage the weightlifting handlebar in the expandable opening when the selectable clamp is in a closed position and disengage with the weightlifting handlebar when the selectable clamp is in an open position. The latch is releasably coupled to the first clamp plate set and the second clamp plate set and secures the weightlifting handlebar when the clamp is in a closed position and release the weightlifting handlebar when the clamp is in an open position.

27 Claims, 18 Drawing Sheets

(56) References Cited

U.S. PATENT DOCUMENTS

| | | | | |
|---|---|---|---|---|
| 4,822,034 | A | 4/1989 | Shields | |
| 6,682,464 | B2 | 1/2004 | Shifferaw | |
| 6,749,547 | B2 | 6/2004 | Krull | |
| 6,855,097 | B2 | 2/2005 | Krull | |
| 6,971,974 | B2 | 12/2005 | Bowman et al. | |
| 7,011,611 | B1 | 3/2006 | Ripley | |
| D528,611 | S | 9/2006 | Flick et al. | |
| 7,121,988 | B2 | 10/2006 | Walkerdine | |
| 7,128,696 | B1 | 10/2006 | Krull | |
| 7,137,931 | B2 | 11/2006 | Liu | |
| 7,153,243 | B1 | 12/2006 | Krull | |
| D536,752 | S | 2/2007 | Walkerdine | |
| 7,172,536 | B2 | 2/2007 | Liu | |
| D540,405 | S | 4/2007 | Crawford et al. | |
| D540,894 | S | 4/2007 | Crawford et al. | |
| 7,223,214 | B2 | 5/2007 | Chen | |
| 7,261,678 | B2 | 8/2007 | Crawford et al. | |
| 7,285,078 | B1 | 10/2007 | Liu | |
| 7,291,098 | B1 | 11/2007 | Krull | |
| 7,300,390 | B1 | 11/2007 | Krull | |
| 7,387,597 | B2 | 6/2008 | Krull | |
| 7,413,533 | B2 | 8/2008 | Lin | |
| 7,452,312 | B2 | 11/2008 | Liu | |
| D584,604 | S | 1/2009 | Baldwin | |
| 7,527,582 | B2 | 5/2009 | Januszek | |
| 7,553,265 | B2 | 6/2009 | Crawford et al. | |
| 7,558,520 | B2 | 7/2009 | Sugawara et al. | |
| 7,588,520 | B2 | 9/2009 | Nalley | |
| 7,604,578 | B2 | 10/2009 | Liu | |
| 7,614,982 | B2 | 11/2009 | Crawford et al. | |
| 7,614,983 | B1 | 11/2009 | Krull | |
| 7,621,855 | B1 | 11/2009 | Krull | |
| D610,636 | S | 2/2010 | Golesh et al. | |
| 7,731,640 | B1 | 6/2010 | Chen | |
| 7,731,641 | B1 | 6/2010 | Chen | |
| 7,794,373 | B2 | 9/2010 | Crawford et al. | |
| 7,887,469 | B1 | 2/2011 | Chen | |
| 7,981,012 | B1 | 7/2011 | Krull | |
| D643,481 | S | 8/2011 | Rauwerdink | |
| 8,002,680 | B2 | 8/2011 | Crawford et al. | |
| 8,007,415 | B1 | 8/2011 | Lundquist | |
| 8,021,282 | B2 | 9/2011 | Polevoy et al. | |
| 8,047,975 | B1 | 11/2011 | Chen | |
| 8,075,458 | B2 | 12/2011 | Nalley | |
| 8,298,125 | B2 | 10/2012 | Colledge et al. | |
| 8,394,004 | B2 | 3/2013 | Towley et al. | |
| 8,784,280 | B2 | 7/2014 | Krull | |
| 8,784,283 | B2 | 7/2014 | Svenberg | |
| 8,992,396 | B2 | 3/2015 | Wang | |
| 9,138,610 | B2 | 9/2015 | Lovegrove et al. | |
| D764,608 | S | 8/2016 | Jones | |
| D766,384 | S | 9/2016 | Jones | |
| 9,504,868 | B2 | 11/2016 | Liu | |
| D780,860 | S | 3/2017 | Jones | |
| D780,861 | S | 3/2017 | Jones | |
| 9,616,270 | B2 | 4/2017 | Towley et al. | |
| 9,616,271 | B2 | 4/2017 | Svenberg | |
| 9,616,273 | B2 | 4/2017 | Chen | |
| 9,616,723 | B2 | 4/2017 | Okerlund | |
| 9,764,182 | B2 | 9/2017 | Rohanna | |
| 9,764,183 | B2 | 9/2017 | Roepke | |
| 9,795,823 | B2 | 10/2017 | Wyncott | |
| D802,064 | S | 11/2017 | Hillson | |
| 9,855,455 | B1 | 1/2018 | Rohanna | |
| 9,855,458 | B2 | 1/2018 | Stilson | |
| 9,895,571 | B2 | 2/2018 | Wang | |
| 9,943,719 | B2 | 4/2018 | Smith et al. | |
| 9,974,994 | B2 | 5/2018 | Svenberg | |
| 10,010,741 | B2 | 7/2018 | Rothschild et al. | |
| 10,035,037 | B2 | 7/2018 | Towley | |
| 10,092,790 | B2 | 10/2018 | Svenberg | |
| 10,099,083 | B1 | 10/2018 | Owusu | |
| 10,166,429 | B2 | 1/2019 | Chen | |
| D843,508 | S | 3/2019 | Pawlas et al. | |
| 10,226,659 | B2 | 3/2019 | Stilson | |
| 10,232,216 | B2 | 3/2019 | Svenberg | |
| 10,343,010 | B2 | 7/2019 | Chen | |
| 10,357,704 | B2 | 7/2019 | Vigiano | |
| D865,881 | S | 11/2019 | Muir et al. | |
| 10,463,906 | B2 | 11/2019 | Owusu | |
| 10,512,815 | B2 | 12/2019 | Stilson | |
| 10,518,123 | B2 | 12/2019 | Moran et al. | |
| D877,824 | S | 3/2020 | Chiang | |
| D885,877 | S | 6/2020 | Magagna et al. | |
| D889,611 | S | 7/2020 | Lippka | |
| D895,745 | S | 9/2020 | Jones | |
| 10,773,118 | B2 | 9/2020 | Svenberg | |
| 10,780,309 | B2 | 9/2020 | Garcia et al. | |
| 10,786,700 | B2 | 9/2020 | Owusu | |
| D900,946 | S | 11/2020 | Muir | |
| D905,805 | S | 12/2020 | Muir et al. | |
| 10,953,262 | B2 | 3/2021 | Garcia Castillo | |
| 10,953,263 | B2 | 3/2021 | Stilson | |
| D919,422 | S | 5/2021 | Stilson | |
| 11,007,397 | B2 | 5/2021 | Liu | |
| 11,052,276 | B1 | 7/2021 | Baker | |
| 11,052,277 | B2 | 7/2021 | Harms | |
| 11,130,014 | B2 | 9/2021 | Sisler | |
| 11,179,594 | B2 | 11/2021 | Chen | |
| 11,185,731 | B2 | 11/2021 | Wang | |
| 11,260,257 | B2 | 3/2022 | Rothschild | |
| 11,273,338 | B2 | 3/2022 | Chen | |
| 11,285,354 | B1 | 3/2022 | Tseng | |
| RE49,009 | E | 4/2022 | Wang | |
| D950,656 | S | 5/2022 | Andersson | |
| 11,358,020 | B2 | 6/2022 | Garcia et al. | |
| 11,389,688 | B2 | 7/2022 | Svenberg | |
| RE49,161 | E | 8/2022 | Myre | |
| D962,364 | S | 8/2022 | Lin | |
| D963,078 | S | 9/2022 | Henniger et al. | |
| 11,452,902 | B2 | 9/2022 | Moran et al. | |
| D966,441 | S | 10/2022 | Sarna et al. | |
| 11,491,361 | B2 | 11/2022 | Flick et al. | |
| 11,529,542 | B2 | 12/2022 | Sisler | |
| 11,534,651 | B2 | 12/2022 | Ercanbrack et al. | |
| 11,565,142 | B2 | 1/2023 | Henniger et al. | |
| 11,565,143 | B2 | 1/2023 | Jones | |
| 11,590,380 | B2 | 2/2023 | Pohl et al. | |
| D982,683 | S | 4/2023 | Lin | |
| D986,355 | S | 5/2023 | Liu | |
| D986,356 | S | 5/2023 | Liu | |
| 11,642,563 | B2 | 5/2023 | Weng | |
| 11,666,793 | B2 | 6/2023 | Rothschild | |
| D992,659 | S | 7/2023 | Liu | |
| 11,712,595 | B2 | 8/2023 | Young | |
| 11,878,201 | B2 | 1/2024 | Sisler | |
| D1,028,130 | S | 5/2024 | Chen | |
| 12,011,634 | B2 | 6/2024 | Pohl et al. | |
| D1,051,258 | S | 11/2024 | Cheng et al. | |
| D1,060,541 | S | 2/2025 | Weng et al. | |
| 12,337,206 | B2 * | 6/2025 | Liu .................... | A63B 21/0724 |
| D1,105,303 | S | 12/2025 | Li | |
| D1,110,444 | S | 1/2026 | Zhou et al. | |
| D1,112,957 | S | 2/2026 | Henniger et al. | |
| 2004/0005969 | A1 | 1/2004 | Chen | |
| 2005/0054496 | A1 | 3/2005 | Harms et al. | |
| 2006/0234843 | A1 | 10/2006 | Chen | |
| 2007/0173386 | A1 | 7/2007 | Wang | |
| 2008/0026921 | A1 | 1/2008 | Liu | |
| 2008/0081744 | A1 | 4/2008 | Gormley | |
| 2008/0287271 | A1 * | 11/2008 | Jones ........................ | F16B 2/10<br>482/107 |
| 2009/0186748 | A1 | 7/2009 | Golesh et al. | |
| 2010/0190618 | A1 | 7/2010 | Chen | |
| 2014/0221175 | A1 | 8/2014 | Liu | |
| 2016/0166873 | A1 | 6/2016 | Liu | |
| 2017/0072243 | A1 | 3/2017 | Chen | |
| 2017/0072248 | A1 | 3/2017 | Chen | |
| 2017/0095688 | A1 | 4/2017 | Stilson | |
| 2018/0147439 | A1 | 5/2018 | Woods | |
| 2018/0169459 | A1 | 6/2018 | Wang | |
| 2019/0046831 | A1 | 2/2019 | Coury | |
| 2019/0366142 | A1 | 12/2019 | Dale | |
| 2020/0306578 | A1 | 10/2020 | Pohl et al. | |

(56) References Cited

U.S. PATENT DOCUMENTS

| | | | | |
|---|---|---|---|---|
| 2021/0001165 | A1 | 1/2021 | Stilson | |
| 2021/0001166 | A1 | 1/2021 | Stilson | |
| 2021/0205653 | A1 | 7/2021 | Stilson | |
| 2021/0275853 | A1 | 9/2021 | Rothschild | |
| 2022/0134167 | A1 | 5/2022 | Rothschild | |
| 2022/0143453 | A1* | 5/2022 | Martin | F16B 2/06 |
| 2022/0212052 | A1 | 7/2022 | Ercanbrack et al. | |
| 2022/0249898 | A1 | 8/2022 | Jiang et al. | |
| 2022/0249900 | A1 | 8/2022 | Yoon | |
| 2022/0314058 | A1 | 10/2022 | Svenberg | |
| 2022/0401785 | A1 | 12/2022 | Gottehrer | |
| 2023/0030139 | A1 | 2/2023 | Flick et al. | |
| 2023/0031956 | A1 | 2/2023 | Luo et al. | |
| 2023/0129601 | A1 | 4/2023 | Kassa | |
| 2023/0147755 | A1 | 5/2023 | Henniger et al. | |
| 2023/0149764 | A1 | 5/2023 | Ollivier | |
| 2023/0158356 | A1 | 5/2023 | Thiam | |
| 2023/0158358 | A1 | 5/2023 | Ercanbrack et al. | |
| 2024/0131386 | A1* | 4/2024 | Liu | A63B 21/075 |
| 2024/0181287 | A1 | 6/2024 | Pohl | |
| 2024/0226642 | A9* | 7/2024 | Liu | A63B 71/0036 |
| 2024/0307752 | A1 | 9/2024 | Chen | |

FOREIGN PATENT DOCUMENTS

| | | | |
|---|---|---|---|
| WO | WO-2017/024611 | A1 | 2/2017 |
| WO | WO-2018/128300 | A1 | 7/2018 |
| WO | WO-2024/118362 | A1 | 6/2024 |

OTHER PUBLICATIONS

International Search Report and Written Opinion on PCT/CN2025/097308, issued Jan. 23, 2026.

Notice of Allowance on U.S. Appl. No. 29/873,544 Dtd Sep. 11, 2024.

Notice of Allowance on U.S. Appl. No. 29/993,561 Dtd Mar. 2, 2026.

Restriction Requirement on U.S. Appl. No. 29/993,561 Dtd Jan. 23, 2026.

* cited by examiner

104

SELECTABLE CLAMP FOR INTERCHANGING WEIGHTLIFTING HANDLEBARS IN AN ADJUSTABLE WEIGHT SET

BACKGROUND

The present disclosure relates generally to an adjustable weight set, and clamps therefor as well as methods of using such adjustable weight sets.

Clamps for weightlifting handlebars are commonly used to secure weights, such as metal or plastic weight plates, to a handlebar. The desired amount of weight is placed onto each end of the handlebar. A clamp is then slid onto each end of the handlebar. Once each of the handlebar clamps is placed against the weight plates, both clamps are secured, or fixed, in place. The clamps prevent the weight plates from sliding off the handlebar while the user is completing various exercises.

Adjustable weight apparatuses are used for various strength exercises. Adjustable weight apparatuses allow the user to have a variety of weight options for the use with a single handlebar type, such as a dumbbell handlebar. Adjustable weight apparatuses also save space. The user can have a variety of weight options, such as dumbbell weight options, without needing space to store a plurality of full dumbbells. However, current adjustable weight apparatuses are designed to work with a single handlebar type. Therefore, the user is limited to exercises involving the single handlebar type that is compatible with the adjustable weight apparatus.

It would be advantageous to provide a selectable clamp for various weightlifting handlebars to provide an improved device that addresses one or more of the aforementioned issues.

SUMMARY

One embodiment of the present disclosure relates to a method of interchanging weightlifting handlebars on an adjustable weight set. The method includes opening a first clamp on a first end of the adjustable weight set to disengage a first end of a weightlifting handlebar and opening a second clamp on a second end of the adjustable weight set to disengage a second end of the weightlifting handlebar. The method also includes removing the weightlifting handlebar from the first clamp and the second clamp. The method further includes inserting another weightlifting handlebar into the first clamp and the second clamp, closing the first clamp on the first end of the adjustable weight set to engage a first end of the other weightlifting handlebar, and closing the second clamp on the second end of the adjustable weight set to engage a second end of the other weightlifting handlebar.

Another embodiment relates to a clamp for a barbell including a first clamp plate set. The first clamp plate set includes a first front clamp plate. The first front clamp plate includes a first pivot point positioned on a first horizontal plane, a first slot positioned on a second horizontal plane above the first pivot point, a first latch opening positioned above the first slot on an outer edge of the first front clamp plate, and a first clamp jaw positioned on an inner edge of the first front clamp between the first pivot point and the first slot. The first front clamp plate includes a first projection positioned below the first clamp jaw. The clamp also includes a second front clamp plate positioned opposite the first front clamp plate. The second front clamp plate includes a second pivot point positioned opposite the first pivot point on the first horizontal plane, a second slot positioned opposite the first slot on the second horizontal plane, and a second latch opening positioned above the second slot and opposite the first latch opening. The clamp also includes a latch. The latch includes a first part comprising a first pin configured to selectively engage the first latch opening and the second latch opening, and a second part. The second part includes a second pin coupling the second part to the second latch opening, and a third pin coupled to a release lever. The release lever is positioned through the second part and configured to engage with the first clamp plate set and rotate about the third pin. The second part also includes a joint positioned between the second pin and the third pin coupling the first part to the second part. The clamp also includes a back plate comprising a plurality of bushings extending through each of the first pivot point, the first slot, the second pivot point, and the second slot. The plurality of bushings is configured to receive a plurality of screws. The outer edge of the first front clamp plate and an outer edge of the second front clamp plate are configured to move inward towards a central axis.

DETAILED DESCRIPTION

Figure 1:
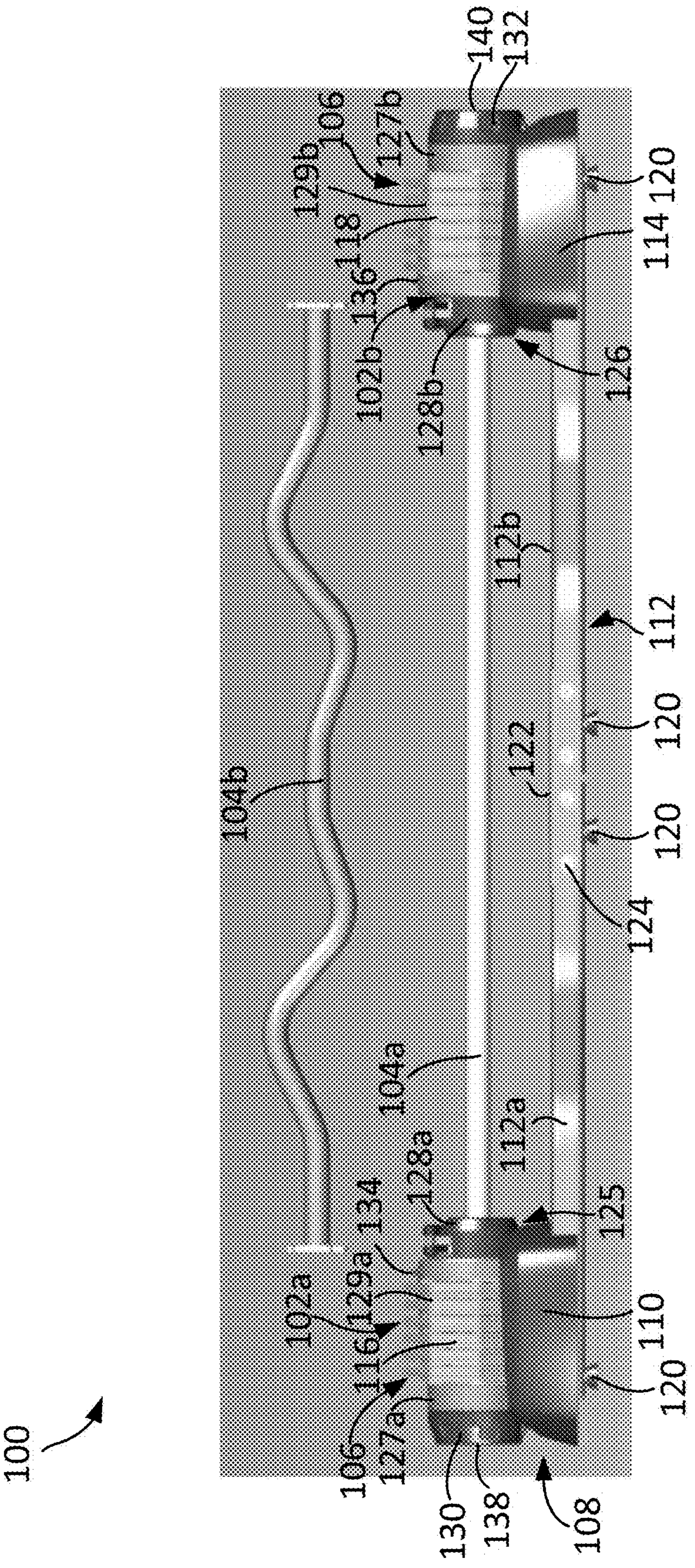
FIG. 1 is a perspective view of a selectable barbell clamp system according to one embodiment.

A selectable clamp for a weightlifting handlebar provides a hassle-free solution for using an adjustable weight apparatus with a plurality of different handlebars.

Referring generally to the FIGURES, disclosed herein is a selectable clamp for a weightlifting handlebar system 100 for weightlifting that generally includes a selectable clamp 102, a weightlifting handlebar 104, and a plurality of selectable weights 106. The selectable clamp provides a secure, but quick release latch for releasably engaging and connecting any of a variety of weightlifting handlebars to weights in an adjustable weight set. When a user desires to change the weightlifting handlebar in the adjustable weight set, the clamp is released and the handlebar is disengaged from the weight set, permitting a different handlebar to be used with the adjustable weight set. In this way, any of a wide variety of weightlifting handlebars can be associated with (e.g. used with, sold with, sold for use with, etc.) a single adjustable weight set. The selectable clamp further includes a first clamp plate set 402 and a second clamp plate set 404. The first clamp plate set 402 and the second clamp plate set 404 are pivotally movable relative to each other. The selectable clamp 102 further includes a latch 408. The latch 408 may be selectively coupled to the first clamp plate set 402 and the second clamp plate set 404. The latch 408 is configured to secure the selectable clamp 102 around the weightlifting handlebar 104.

Figure 2:
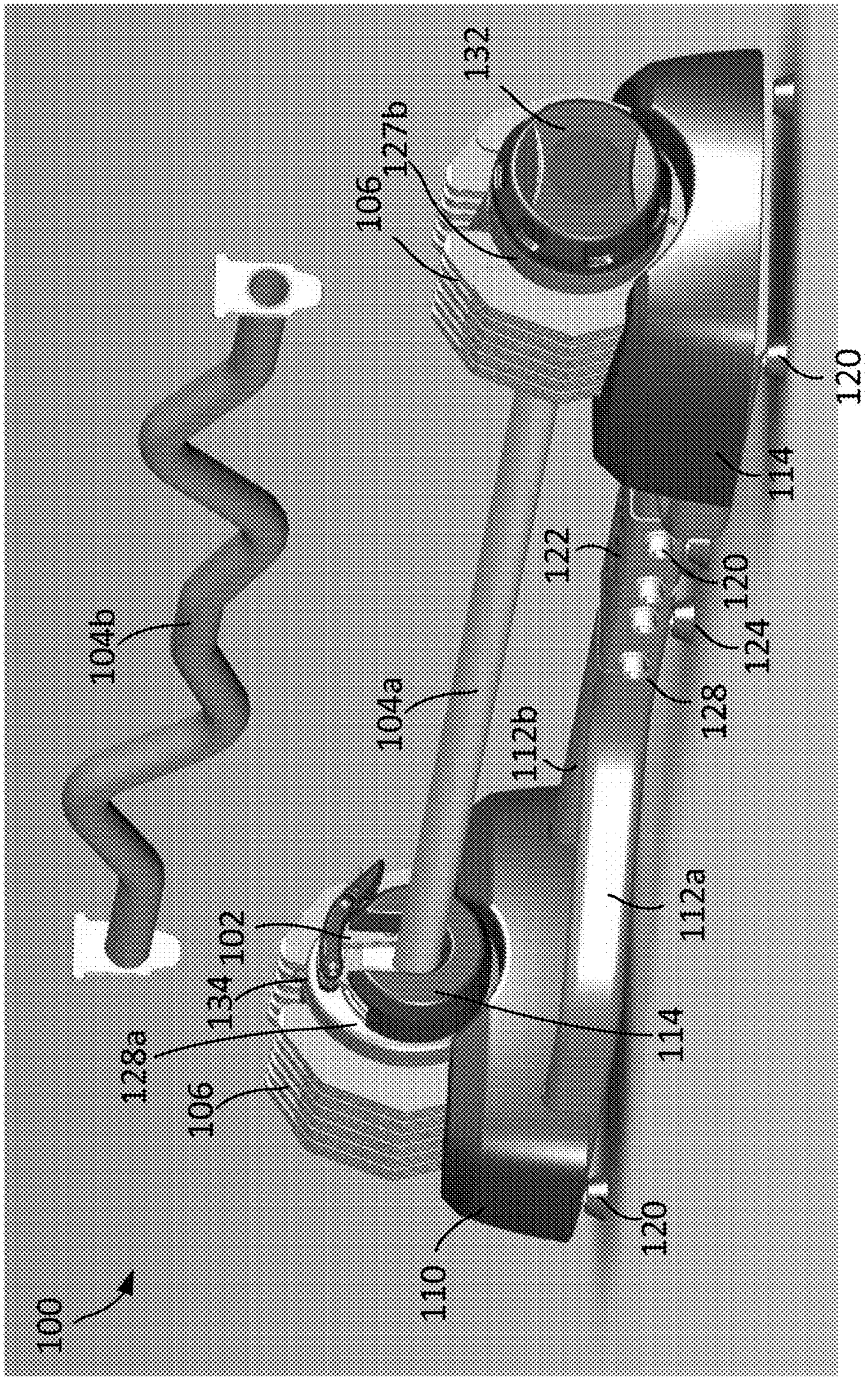
FIG. 2 is a side perspective view of the selectable barbell clamp system according to the embodiment of FIG. 1.
Figure 3:
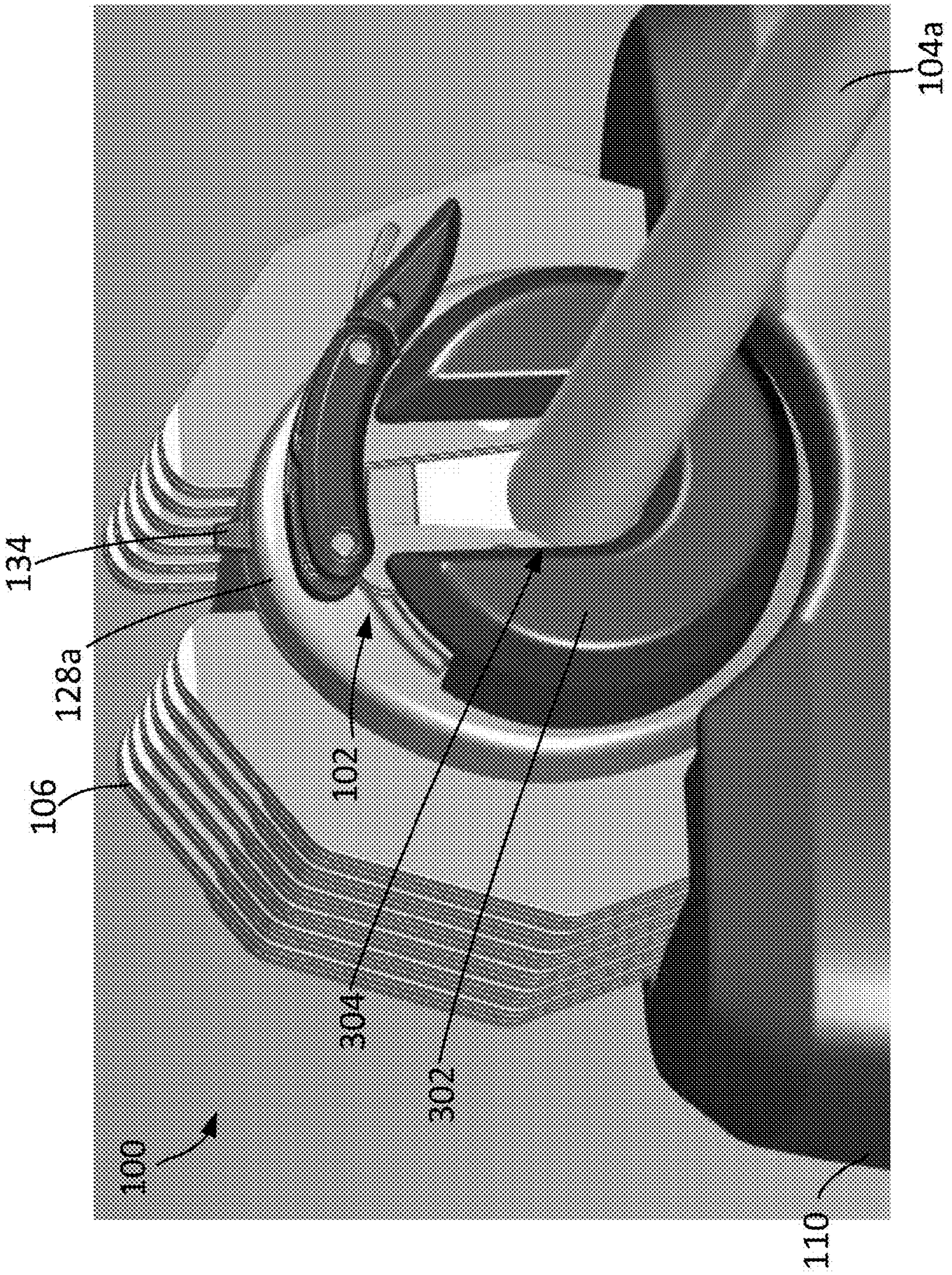
FIG. 3 is a side perspective view of the selectable barbell clamp according to the embodiment of FIG. 1.

Referring more particularly to FIGS. 1-3, an exemplary embodiment of the selectable clamp for a weightlifting handlebar system 100 is illustrated. As shown in FIG. 1, the selectable clamp for a weightlifting handlebar system 100 includes a selectable clamp 102, a weightlifting handlebar 104, and a plurality of selectable weights 106. The plurality of selectable weights can include a first weight set 116 and a second weight set 118. The first weight set 116 is positioned on an end of the weightlifting handlebar 104 opposite the second weight set 118. The selectable clamp 102 is configured to engage the weightlifting handlebar 104 and secure an amount of the plurality of selectable weights 106 (e.g., 10 lbs., 20 lbs., etc.) to the weightlifting handlebar 104.

The selectable clamp for a weightlifting handlebar system 100 can be stored in a storage rack 108. The storage rack 108 prevents the selectable clamp for a weightlifting handlebar system 100 from moving (e.g., rolling) when not in use. The storage rack 108 includes a first weight rack 110, a central bar 112, and a second weight rack 114. The first weight rack 110 is configured to store the first weight set 116 of the plurality of selectable weights 106. The second weight rack 114 is configured to store the second weight set 118 of the plurality of selectable weights 106. The weightlifting handlebar 104 can selectively couple the first weight set 116 to the second weight set 118. The central bar 112 couples the first weight rack 110 to the second weight rack 114.

The storage rack 108 may further include a plurality of feet 120. The plurality of feet 120 may be positioned on a bottom surface of one or more of the first weight rack 110, the central bar 112, and the second weight rack 114. The plurality of feet 120 may be configured to prevent the storage rack 108 from moving (e.g., sliding, slipping, etc.) when re-racking the selectable barbell clamp system 100. Alternatively, a non-slip mat or padding may be attached or placed under the storage rack to prevent sliding or slipping.

The storage rack 108 may further include a connecting plate 122 and a plurality of bolts (e.g., screws, fasteners, pin, etc.) 124. The connecting plate 122 may be positioned centrally on the central bar 112. The plurality of bolts 124 are positioned on a side of the connecting plate 122. According to some embodiments, the central bar 112 may include a first bar **112*a* and a second bar 112*b* coupled by the connecting plate 122. For example, the connecting plate 122 and plurality of bolts 124 may secure the first bar 112*a* to the second bar 112*b***.

The storage rack 108 may also include a first set of barbell seats (not shown) and a second set of barbell seats (not shown). The first set of barbell seats may be positioned on a first end of each of the first weight rack 110 and the second weight rack 114. The second set of barbell seats may be positioned on a second end of each of the first weight rack 110 and the second weight rack 114 opposite the first set of barbell seats. The first set of barbell seats are configured to receive a first weightlifting handlebar 104. For example, the first set of barbell seats may receive and store a straight weightlifting handlebar **104*a*. The second set of barbell seats is configured to receive a second weightlifting handlebar 104. For example, the second set of barbell seats may receive and store a curl bar weightlifting handlebar 104*b*. The first set of barbell seats and the second set of barbell seats are configured to engage (e.g., receive, etc.) the first weightlifting handlebar 104*a* and the second weightlifting handlebar 104*b*, respectively, such that the selectable clamp system 100 can be stored on and/or within the storage rack 108. Types of handlebars that may be suitable for use with the weightlifting handlebar system 100** include a straight bar, a curl bar, a squat bar, a deadlift bar, a bench press bar, a trap bar, a weightlifting bar, a safety squat (yoke) bar, cambered bar, a Swiss bar, or the like.

The selectable clamp for a weightlifting handlebar system 100 also includes a first weight housing 125 and a second weight housing 126. The first weight housing 125 includes a first distal housing end **127*a*, a first proximal housing end 128*a*, and a first weight coupling portion 129*a*. The first distal housing end 127*a* is positioned opposite the selectable clamp 102. The first proximal weight housing end 128*a* is positioned adjacent to the selectable clamp 102. The first weight coupling portion 129*a* is positioned between and couples the first distal housing end 127*a* to the first proximal housing end 128*a*. The first weight housing 125 is configured to couple and uncouple the desired amount of weight from the first weight set 116 to the weightlifting handlebar 104**.

The second weight housing 126 includes a second distal housing end **127*b*, a second proximal housing end 128*b*, and a second weight coupling portion 129*b*. The second distal housing end 127*b* is positioned opposite the selectable clamp 102. The second proximal weight housing end is positioned adjacent to the selectable clamp 102. The second weight coupling portion 129*b* is positioned between couples the second distal housing end 127*b* to the second proximal housing end 128*b*. The second weight housing 126 is configured to couple and uncouple the desired amount of weight from the second weight set 118 to the weightlifting handlebar 104**.

The selectable clamp for a weightlifting handlebar system 100 further includes a first weight dial 130, a second weight dial 132, a first weight button 134, and a second weight button 136. The first weight dial 130 is positioned on the first distal housing end **127*a*. The second weight dial 132 is positioned on the second distal housing end 127*b*. The first weight button 134 is positioned on the proximal end of first weight housing 125. The second weight button 136 is positioned on the proximal end of the second weight housing 126. The first weight dial 130 and the second weight dial 132 rotate (e.g., clockwise, counterclockwise, etc.). For example, the user may press down on the first weight button 134 and rotate the first weight dial 130 a first direction (e.g., clockwise) to increase the amount of weight selected. The user may also press down on the first weight button 134 and rotate the first weight dial 130 a second direction (e.g., counterclockwise) to decrease the amount of weight selected. When the user releases the first weight button 134, the amount of weight selected will be coupled to the weightlifting handlebar 104. To have a balanced amount of weight on each end of the weightlifting handlebar 104, the user may repeat the process of selecting an amount of weight of the second weight set 118 by using the second weight button 136 and the second weight dial 132**.

Each of the first weight set 116 and the second weight set 118 may include a first weight display 138 and a second weight display 140 respectively. The first weight display 138 may be positioned on the proximal end of the first weight set 116 adjacent to the first weight button 134. The first weight display 138 is configured to display a number associated with the selected amount of weight for the first weight set 116. For example, as the user rotates the first weight dial 130, the first weight display 138 displays a number that is associated with the total weight on a first end of the weightlifting handlebar 104. The second weight display 140 may be positioned on the proximal end of the second weight set 118 adjacent to the second weight button 136. The second weight display 140 is configured to display a number associated with the selected amount of weight for the second weight set 118. For example, as the user rotates the second weight dial 132, the second weight display 140 displays a number that is associated with the total weight on a second end of the weightlifting handlebar 104.

The clamp for a weightlifting handlebar system 100 further includes a selectable clamp 102. The weightlifting handlebar system 100 includes at least one selectable clamp 102. For example, a selectable clamp 102 is positioned adjacent to the first weight set 116 and another selectable clamp 102 is positioned adjacent to the second weight set 118. The selectable clamp 102 is configured to selectively couple the weightlifting handlebar 104 to at least one of the first weight set 116 and the second weight set 118.

As shown in FIG. 3, the selectable clamp for a weightlifting handlebar system 100 includes a front clamp plate cover 302. The front clamp plate cover 302 includes an opening 304. The opening 304 of the front clamp plate cover 302 may be substantially U-shaped such that the weightlifting handlebar 104 can be placed in (e.g., engage with, surround, etc.) the selectable clamp 102. The front clamp plate cover 302 is coupled to a front side of the selectable clamp 102. The front clamp plate cover 302 is configured to prevent objects from getting caught in the selectable clamp 102. Further, the front clamp plate cover 302 is configured to encapsulate the front and sides of the selectable clamp 102.

Figure 4:
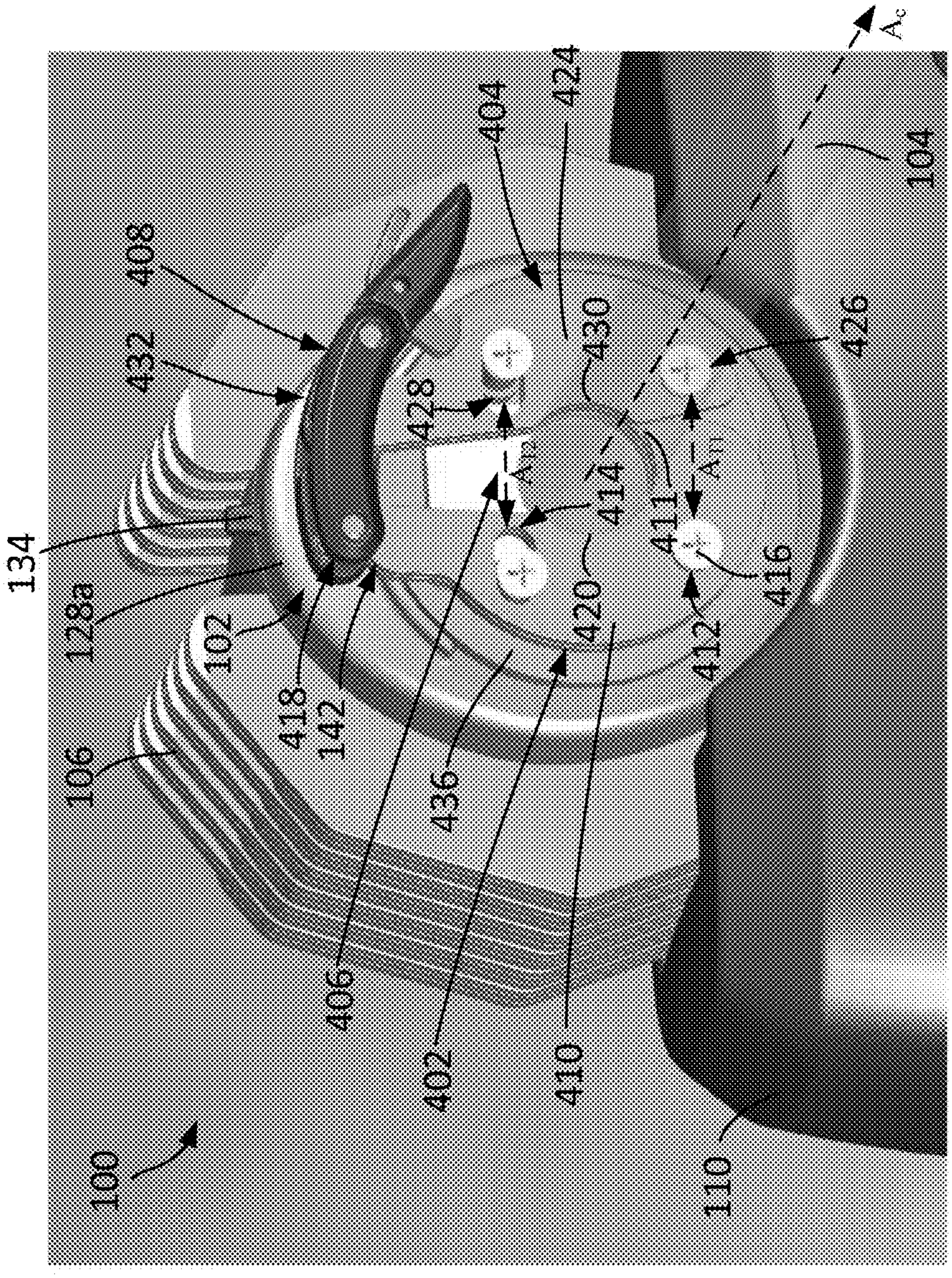
FIG. 4 is a side perspective view of the interior of the selectable barbell clamp with a barbell according to the embodiment of FIG. 1.
Figure 5:
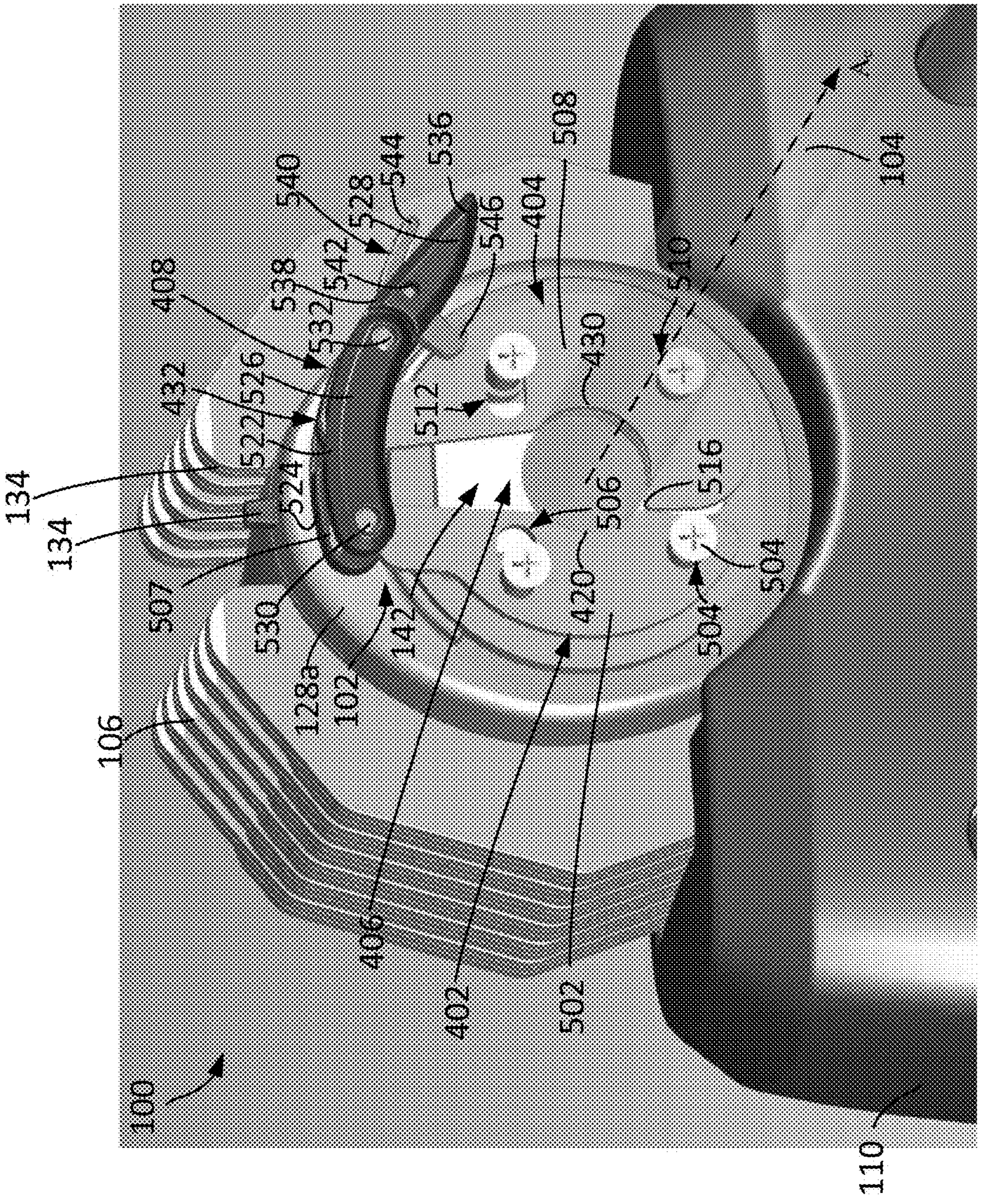
FIG. 5 is another side perspective view of the interior of the selectable barbell clamp with a barbell according to the embodiment of FIG. 1.

Referring more particularly to FIG. 4 and FIG. 5, an exemplary embodiment of the selectable clamp 102 for the clamp system 100 is shown. The selectable clamp 102 includes a first clamp plate set 402 and a second clamp plate set 404. The first clamp plate set 402 and the second clamp plate set 404 define an expandable opening 406. The expandable opening 406 is positioned between the first clamp plate set 402 and the second clamp plate set 404. The expandable opening 406 is configured to receive the weightlifting handlebar 104. The first clamp plate set 402 and the second clamp plate set 404 are configured to engage the weightlifting handlebar 104 in the expandable opening 406 when the selectable clamp 102 is in a closed position and disengage the weightlifting handlebar 104 when the selectable clamp 102 is in an open position.

The selectable clamp 102 further includes a latch 408. The latch 408 is releasably coupled (e.g., selectively coupled, etc.) to the first clamp plate set 402 and the second clamp plate set 404. The latch 408 is configured to secure the first clamp plate set 402 and the second clamp plate set 404 to the weightlifting handlebar 104 when the selectable clamp 102 is in a closed position. The latch 408 is further configured to release the first clamp plate set 402 and the second clamp plate set 404 from the weightlifting handlebar 104 when the clamp is in an open position. For example, when the selectable clamp 102 is in an open position (e.g., the latch is released, disengaged, etc.)) the expandable opening is larger (e.g., wider, etc.) than when the selectable clamp 102 is in a closed position. For example, when the selectable clamp 102 is in an open position, the first clamp plate set 402 and the second clamp plate set 404 are disengaged from the weightlifting handlebar 104 widening the expandable opening 406 to allow the weightlifting handlebar 104 to be removed from the selectable clamp 102.

The first clamp plate set 402 includes a first front clamp plate 410. The first front clamp plate 410 includes a first pivot point 412 and a first slot 414. The first pivot point 412 is positioned on a lower half of the first front clamp plate 410 when looking down a longitudinal axis (e.g., a central axis $A_{C}$.) of the selectable clamp 102. The first pivot point 412 may be a circular opening configured to receive one of a plurality of screws 416. The first slot 414 is positioned above the first pivot point 412 and in an upper half of the first front clamp plate 410 when looking down a longitudinal axis (e.g., central axis $A_c$) of the selectable clamp 102. The first slot 414 may be substantially oval in shape and be configured to receive one of the plurality of screws 416. For example, the first slot 414 is configured to allow the screw 416 to move laterally within the first slot 414 allowing the first front clamp plate 410 to pivot (e.g., rotate) outward about the first pivot point 412 to widen the expandable opening 406 relative to the central axis $A_c$.

The first front clamp plate 410 includes a first latch opening 418. The first latch opening 418 is positioned above the first slot 414 on an outer edge of the first clamp plate set 402. For example, the first latch opening 418 is defined by the first clamp plate set 402. For example, the first front clamp plate 410 may include a first front clamp plate hook 411. The first front clamp plate hook 411 can define the first latch opening 418 and is configured to engage with the latch 408 to couple the first clamp plate set 402 to the second clamp plate set 404.

The first front clamp plate 410 further includes a first clamp jaw 420. The first clamp jaw 420 is positioned on an inner edge of the first clamp plate set 402 between the first pivot point 412 and the first slot 414. The first clamp jaw 420 defines a portion of the expandable opening 406. The first clamp jaw 420 is in contact with the weightlifting handlebar 104 when the selectable clamp 102 is in a closed position.

The first front clamp plate 410 further includes a first projection 422. The first projection 422 is positioned below the first clamp jaw 420. The first projection 422 is configured to engage with the weightlifting handlebar 104. The first projection 422 may be in a first position when the selectable clamp 102 is in an open position. For example, the first projection 422 may be protruding upward into the expandable opening 406 when the clamp is in an open position. When the weightlifting handlebar 104 is placed into the expandable opening 406 the first projection 422 may be positioned in a second position. For example, the first projection 422 may move downward as the first front clamp plate 410 pivots (e.g., rotates, moves, etc.) about the first pivot point 412 into a closed position.

The second clamp plate set 404 includes a second front clamp plate 424. The second front clamp plate 424 is positioned opposite the first front clamp plate 410. The second front clamp plate 424 includes a second pivot point 426 and a second slot 428. The second pivot point 426 is positioned on a lower half of the second front clamp plate 424 when looking down a longitudinal axis of the selectable clamp 102 and opposite the first pivot point 412. For example, the second pivot point 426 and the first pivot point 412 may be positioned along a first transverse axis $A_{T1}$. The second pivot point 426 may be a circular opening configured to receive one of the plurality of screws 416. The second slot 428 is poisoned above the second pivot point 426 and in an upper half of the second front clamp plate 424 when looking down the longitudinal axis (e.g., the central axis $A_c$) of the selectable clamp 102 and opposite of the first slot 414. For example, the second slot 428 and the first slot 414 may be positioned along a second transverse axis $A_{T2}$.

The second clamp plate set 404 also includes a second clamp jaw 430. The second clamp jaw 430 is positioned on an inner edge of the second clamp plate set 404 between the second pivot point 426 and the second slot 428. The second clamp jaw 430 is also positioned opposite the first clamp jaw 420. The second clamp jaw 430 defines a portion of the expandable opening 406. The second clamp jaw 430 is in contact with the weightlifting handlebar 104 when the selectable clamp 102 is in a closed position.

The second front clamp plate 424 includes (e.g., defines) a second latch opening 432. The second latch opening 432 is positioned above the second slot 428 on an outer edge of the second clamp plate set 404. The second latch opening 432 selectively couples the second clamp plate set 404 to the first clamp plate set 402. For example, the second latch opening 432 may be defined by a hook or aperture configured to engage with the latch 408. For example, the second front clamp plate 424 may include an aperture 434 defining the second latch opening 432.

As shown in FIG. 4, the selectable clamp 102 further includes a back plate 436. The back plate is positioned behind the first clamp plate set 402 and the second clamp plate set 404 and adjacent to the proximal housing end 128. The back plate 436 is positioned a distance away from the first clamp plate set 402 and the second clamp plate set 404. The back plate 436 is configured to couple the selectable clamp 102 to the proximal housing end 128. The first clamp plate set 402 and the second clamp plate set 404 along with the back plate 436 define a cavity for receiving an end of the weightlifting handlebar 104.

As shown in FIG. 5, the first clamp plate set 402 further includes a first rear clamp plate 502. The first rear clamp plate 502 includes a first rear pivot point 504, and a first rear slot 506. The first rear pivot point 504 is positioned on a lower half of the first rear clamp plate 502 when looking down the longitudinal axis of the selectable clamp 102. The first rear pivot point 504 may be a circular opening configured to receive one of the plurality of screws 416. The first rear pivot point 504 is axially aligned with the first pivot point 412.

The first rear slot 506 is positioned above the first rear pivot point 504 and in an upper half of the first rear clamp plate 502 when looking down the longitudinal axis of the selectable clamp 102. The first rear slot 506 is aligned with the first slot 414. The first rear slot 506 may be substantially oval in shape and be configured to receive one of the plurality of screws 416. For example, the first rear slot 506 is configured to allow the screw 416 to move laterally within the first rear slot 506. For example, the first rear clamp plate 502 is configured to pivot (e.g., rotate) outward about the first rear pivot point 504 to enlarge the expandable opening 406 relative to the central axis $A_c$.

The first rear clamp plate 502 also includes a first rear clamp plate hook 507. The first rear clamp plate hook 507 is positioned on a top edge of the first rear clamp plate 502. In other embodiments, the first rear clamp plate hook 507 may be positioned on a side or a bottom of the first rear clamp plate 502. The first rear clamp plate hook 507 is aligned with the first front clamp plate hook 411. For example, the first rear clamp plate hook 507 is in confronting relation to the first front clamp plate hook 411 and aligned with the first front clamp plate hook 411. Together, the first front clamp plate hook 411 and the first rear clamp plate hook 507 can define the first latch opening 418. Instead in other embodiments, the first front clamp plate hook 411 and the first rear clamp plate hook 507 may be apertures defining the first latch opening 418 (e.g., a circular opening, a slot, etc.).

The second clamp plate set 404 further includes a second rear clamp plate 508. The second rear clamp plate 508 includes a second rear pivot point 510 and a second rear slot 512. The second rear pivot point 510 is positioned on a lower half of the second rear clamp plate 508 when looking down the longitudinal axis of the clamp. The second rear pivot point may be a circular opening configured to receive one of the plurality of screws 416. The second rear pivot point 510 is axially aligned with the second pivot point 426.

The second rear slot 512 is positioned above the second rear pivot point 510 and in an upper half of the second rear clamp plate 508 when looking down the longitudinal axis of the selectable clamp 102. The second rear slot 512 may be substantially oval in shape and be configured to allow the screw 416 to move laterally within the second rear slot 512. For example, the second rear clamp plate 508 is configured to pivot outward about the second rear pivot point 510 to enlarge the expandable opening 406 relative to the central axis $A_c$.

The second rear clamp plate 508 also includes a second projection 516. The second projection 516 is positioned below the second clamp jaw 514. The second projection 516 may be hook-like in shape. The second projection may also extend across the central axis $A_c$ of the selectable clamp 102 such that the second projection 516 may overlap a portion of a first projection 422. The second projection 516 can move from a first position protruding into the expandable opening 406, downward to a second position flush with the first projection 422. For example, when the weightlifting handlebar 104 is placed into the expandable opening 406, the weightlifting handlebar 104 engages with (e.g., comes in contact with) each of the first projection 422 and the second projection 516 forcing the first front clamp plate 310 and the second rear clamp plate 508 to pivot about the second rear pivot point 510, thus positioning the selectable clamp 102 in a closed position. For example, the weightlifting handlebar 104 provides downward pressure on each of the first projection 422 and the second projection 516 causing the first front clamp plate 310 and the second rear clamp plate 508 to pivot about the second rear pivot point 510.

Once each of the first clamp plate set 402 and the second clamp plate set 404 are positioned in a closed position, the latch 408 can couple the first clamp plate set 402 to the second clamp plate set 404. The latch 408 is releasably coupled to the first clamp plate set 402 and the second clamp plate set 404. For example, the latch 408 couples the first clamp plate set 402 to the second clamp plate set 404 when the selectable clamp 102 is in a closed position. When the selectable clamp 102 is in an open position, the latch 408 may be coupled to at least one of the first clamp plate set 402 and the second clamp plate set 404.

As shown generally in the Figures, the latch 408 is fixedly coupled to the second clamp plate set 404. For example, the second front clamp plate 424 and the second rear clamp plate 508 may include a latch aperture (e.g., the second latch opening 432) positioned at a top edge of each of the second front clamp plate 424 and the second rear clamp plate 508 when looking down a longitudinal axis of the selectable clamp 102. In other embodiments, the latch 408 may be removably coupled to each of the first clamp plate set 402 and the second clamp plate set 404.

The latch 408 may also include a front edge 522 and a rear edge 524. The front edge 522 is positioned inward (e.g., proximally to the center of the selectable barbell clamp system 100) from the rear edge 524 when looking down a longitudinal axis of the selectable clamp 102. For example, the rear edge 524 is positioned adjacent to the proximal housing end 128. A metal dowel (e.g., a pin, bolt, etc.) extends from the front edge 522 to the rear edge 524. The metal dowel may be positioned through the latch aperture of each of the second front clamp plate 424 and the second rear clamp plate 508.

The latch 408 includes a first part 526 and a second part 528. However, in other embodiments, the latch 408 may only include a first part 526. The first part 526 is configured to engage the first latch opening 418 and the second latch opening 432. For example, the latch 408 may include a first pin 530. The first pin 530 is configured to engage with the first latch opening 418 of the first clamp plate set 402. For example, the first pin 530 may be placed into the first latch opening 418 of the first clamp plate set 402 to secure the first clamp plate set 402 to the second clamp plate set 404, thus closing the expandable opening 406 around the weightlifting handlebar 104. The first pin 530 may then be removed from the first latch opening 418 of the first clamp plate set 402 to release the latch 408 opening the expandable opening 406 such that the weightlifting handlebar 104 may be removed from the selectable clamp 102.

The latch 408 may further include a second pin 532. The second pin 532 is configured to engage with the second latch opening 432. For example, the second pin 532 may be selectively engaged with second clamp plate set 404 via the second latch opening 432, such that the second pin 532 may be removable from the second latch opening 432. In other embodiments, the second pin 532 may be fixedly (e.g., connected, secured, etc.) coupled to the second clamp plate set 404 within the second latch opening 432.

The second part 534 is positioned on a distal end of the latch 408. The second part 534 is configured to secure and release the latch 408 from the first clamp plate set 402 and the second clamp plate set 404. The second part 534 includes a tapered end 536 and a connecting end 538. The tapered end 536 can be ergonomically shaped to aid the user in securing and releasing the selectable clamp 102. The connecting end 538 is configured to couple the first part 526 to the second part of 534 of the latch 408. For example, the connecting end 538 may be inserted into an interior cavity of the first part 526. Then the second pin 532 may be placed through the first part 526 and the second part 534 coupling the second part 534 to the first part 526 of the latch 408.

The latch 408 further includes a release lever 540 and a third pin 542. The release lever 540 is positioned through an interior cavity of the second part 534. The release lever 540 is also coupled to the second part 534. The third pin 542 is positioned through the second part 534 and the release lever 540. The third pin 542 is configured to couple the release lever 540 to the second part 534. The release lever 540 is configured to prevent the latch 408 from releasing and opening the expandable opening 406 while using the weightlifting handlebar for exercises. For example, the release lever may further secure the latch 408 and the selectable clamp 102 in a closed position.

The release lever 540 includes a release tab 544 and a release hook 546. The release tab 544 is positioned on a portion of the release lever 540 above the second part 534. The release hook 546 is positioned on a portion of the release lever 540 below the second part 534. The release tab 544 is configured to release or disengage the release lever 540 from the second clamp plate set 404. The release hook 546 is configured to engage (e.g., be in contact with, etc.) the second clamp plate set 404 to prevent the latch 408 from releasing and opening the selectable clamp 102 at an undesirable time. For example, the user may press down on the release tab 544, rotating the release lever 540 about the third pin 542 to disengage the release lever 540 from the second clamp plate set 404. By rotating the release lever 540 about the third pin 542, the release hook 546 also rotates. For example, when the release hook 546 rotates, the release hook is disengaged from the second clamp plate set 404. Instead, in other embodiments, the latch 408 may include a release button instead of a release lever 540. For example, the user may pressure the release button to release the latch 408 from at least one of the first clamp plate set 402 and the second clamp plate set 404.

Figure 6C:
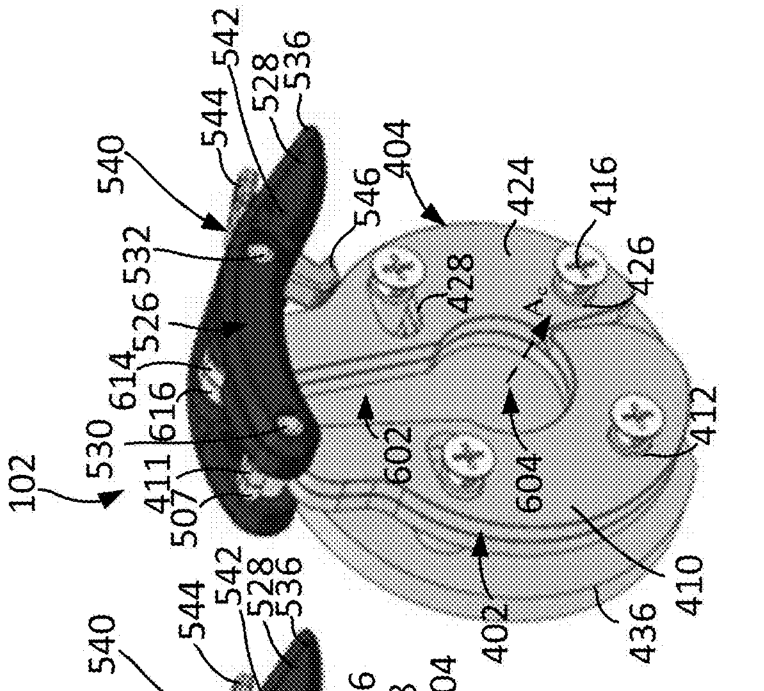
FIG. 6C is a side perspective view of the selectable barbell clamp in a closed and unlocked position according to the embodiment of FIG. 1.
Figure 6B:
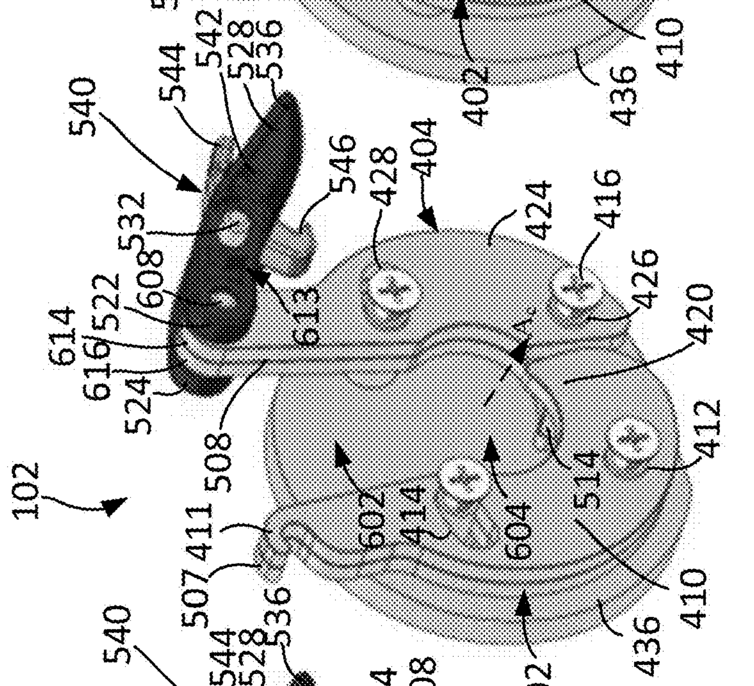
FIG. 6B is a side perspective view of the selectable barbell clamp in an open position according to the embodiment of FIG. 1.
Figure 6A:
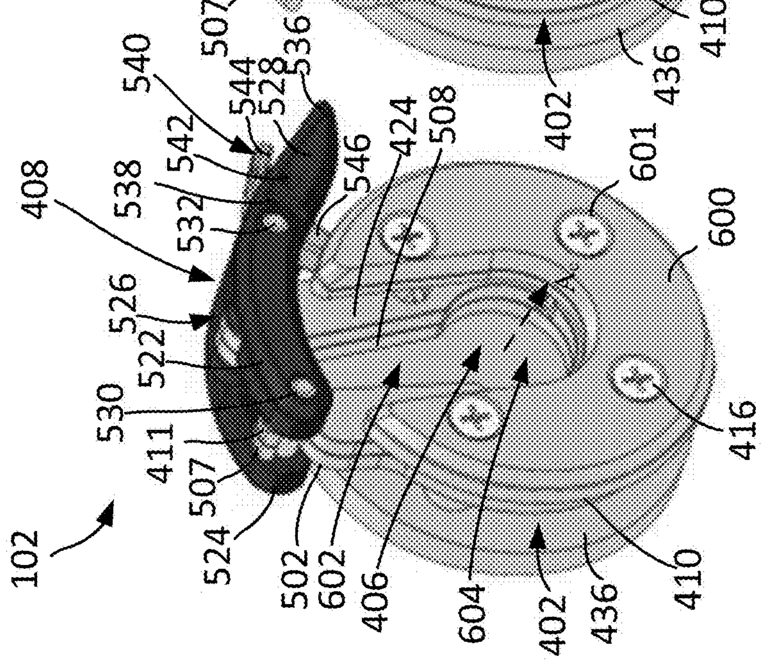
FIG. 6A is a side perspective view of the selectable barbell clamp in a closed and locked position according to the embodiment of FIG. 1.

FIGS. 6A-6C illustrate the selectable clamp 102 for a weightlifting handlebar system 100. FIG. 6A illustrates the selectable clamp 102 in a closed and locked position. As shown in FIG. 6A, the selectable clamp 102 can include a front plate 600. The front plate 600 is positioned in front (e.g., in confronting relation to, adjacent to, etc.) of each of the first front clamp plate 410 and the second front clamp plate 424. The front plate 600 includes a plurality of front plate annular openings 601. The front plate annular openings 601 are configured to receive the plurality of screws 416 coupling the front plate 600 to each of the first clamp plate set 402, the second clamp plate set 404, and the back plate 436. The front plate 600 is stationary relative to the first clamp plate set 402 and the second clamp plate set 404. In other embodiments, the front plate 600 may move with (e.g., rotate with, etc.) one of the first clamp plate set 402 and the second clamp plate set 404. Also shown in FIG. 6A, is the front clamp plate cover 600. The front plate 600 may be plastic, metal, or any material capable of covering the first clamp plate set 402 and the second clamp plate set 404. The front plate 600 is configured to cover the first slot 414 and the second slot 428. For example, the front plate 600 may prevent objects from getting lodged (e.g., stuck, caught, etc.) within the first slot 414 and the second slot 428.

The latch 408 is coupled to each of the first clamp plate set 402 and the second clamp plate set 404. The first pin 530 is positioned within the first latch opening 418 of the first front clamp plate 310 and the first rear clamp plate 502 such that the first front clamp plate hook 411 and the first rear clamp plate hook 507 are engaged with the first pin 530.

In FIG. 6A the expandable opening 406 is defined in a closed position (e.g., the first clamp plate set 402 and the second clamp plate set 404 are rotated inward towards the central axis $A_c$). The expandable opening 306 includes an upper portion 602 and a lower portion 604. The upper portion 602 is positioned adjacent to (e.g., below) the latch 408. The lower portion 604 is defined by the first clamp jaw 420 and the second clamp jaw 514. For example, the lower portion 604 may be substantially circular in shape to conform around the weightlifting handlebar 104. When the selectable clamp 102 is in a closed position, the upper portion 602 of the expandable opening 406 has a smaller horizontal distance between the first clamp plate set 402 and the second clamp plate set 404. For example, the upper portion 602 of the expandable opening 406 may be smaller than the lower portion 604 of the expandable opening 406. The upper portion 602 of the expandable opening 406 may be smaller than the lower portion 604 of the expandable opening 406 to prevent movement of the weightlifting handlebar 104 when engaged with the selectable clamp 102.

FIG. 6B illustrates the selectable clamp 102 in an open position without the front clamp plate cover 302 as shown in FIG. 6A. As shown in FIG. 6B, when the selectable clamp 102 is in an open position, the first clamp plate set 402 and the second clamp plate set 404 rotate about the first pivot point 412 and the second pivot point 426 respectively. For example, the first clamp plate set 402 and the second clamp plate set 404 may pivot outward with respect to the central axis $A_c$. When the first clamp plate set 402 and the second clamp plate set 404 pivot outward (e.g., away from the central axis $A_c$), the upper portion 602 of the expandable opening expands (e.g., becomes larger, widens, etc.). For example, a horizontal distance between an interior edge of the first clamp plate set 402 and an interior edge of the second clamp plate set 404 may be larger than the horizontal distance when the selectable clamp 102 is in a closed position.

Further, as shown in FIG. 6B, when the selectable clamp 102 is in an open position, the first front clamp plate 410 pivots about the first pivot point 412 such that the first clamp jaw 420 is positioned within the expandable opening 406. For example, as the first front clamp plate hook 411 rotates outward away from the central axis $A_c$, the first clamp jaw 420 rotates upward into the lower portion 604 of the expandable opening 406 when the selectable clamp is in an open position and the weightlifting handlebar is disengaged (e.g., removed, etc.) from the selectable clamp 102.

The second clamp plate set 404 pivots about the second pivot point 426, such that the second clamp jaw 514 is positioned within the expandable opening 406. For example, as the first rear clamp plate hook 507 rotates outward away from the central axis $A_c$ in a direction opposite of the first front clamp plate hook 411, the second clamp jaw 514 rotates upward into the lower portion 604 of the expandable opening 406 when the selectable clamp is in an open position and the weightlifting handlebar is disengaged from the selectable clamp 102.

The first clamp jaw 420 and the second clamp jaw 514 are configured to engage with the weightlifting handlebar 104. For example, when the selectable clamp 102 is positioned in an open position and each of the first clamp jaw 420 and the second clamp jaw 514 are rotated into the lower portion 604 of the expandable opening 406, the first clamp plate set 402 and the second clamp plate set 404 are rotated outward (e.g., away from the central axis $A_c$) widening the upper portion 602 of the expandable opening. By enlarging the upper portion 602 of the expandable opening, the selectable clamp 102 is in a desirable open position to receive the weightlifting handlebar 104 For example, the upper portion 602 of the expandable opening 406 may be slanted such that the upper portion 602 tapers down to the lower portion 604 to guide the weightlifting handlebar 104 into the lower portion 604 of the expandable opening 406.

As the weightlifting handlebar 104 is placed in the expandable opening 406, the weightlifting handlebar 104 engages with each of the first clamp jaw 420 and the second clamp jaw 514. For example, the weightlifting handlebar 104 may press downward (e.g., exert a downward force, etc.) on each of the first clamp jaw 420 and the second clamp jaw 514. As the weightlifting handlebar 104 exerts a downward force on each of the first clamp jaw 420 and the second clamp jaw 514, the first clamp plate set 402 and the second clamp plate set 404 rotate inward relative to the central axis $A_c$. For example, when a force is applied by the weightlifting handlebar 104, the first clamp jaw 420 is forced downward, rotating the first front clamp plate inward towards the central axis $A_c$. The first clamp jaw 420 is in contact with a bottom second front clamp plate interior edge 610, such that the downward rotation of the first clamp jaw 420 forces the second front clamp plate 424 to also rotate inward with respect to the central axis $A_c$. Also, when the second clamp jaw 514 is pressed down on by the weightlifting handlebar 104, the second clamp jaw 514 is forced downward, rotating the second rear clamp plate 508 inwards towards the central axis $A_c$. The second clamp jaw 514 is in contact with a bottom first rear clamp plate interior edge 612, such that the downward rotation of the second clamp jaw 515 forced the first rear clamp plate 502 to also rotates inward with respect to the central axis $A_c$.

FIG. 6B also illustrates the selectable clamp 102 for system 100 without the first part 526 of the latch 408. FIG. 6B illustrates an interior portion 613 of the second part 528. The interior portion 613 of the second part 528 is positioned within the first part 526 of the latch 408. As shown in FIG. 6B, the second front clamp plate 424 and the second rear clamp plate 508 may include a front annular opening 614 and a rear annular opening 616, respectively. For example, the front annular opening 614 and the rear annular opening 616 may be positioned on a top edge of each of the second front clamp plate 424 and the second rear clamp plate 508 opposite the first front clamp plate hook 411 and the first rear clamp plate hook 507. The second pin 532 is positioned through each of the front annular opening 614 and the rear annular opening 616, fixedly coupling the second front clamp plate 424 and the second rear clamp plate 508 to the latch 408.

As shown in FIGS. 6B-6C, the plurality of screws 416 move laterally within the first slot 414 and the second slot 428. For example, as shown in FIG. 6B, when the selectable clamp 102 is in an open position and the weightlifting handlebar 104 is disengaged from the selectable clamp 102, the plurality of screws 416 are positioned proximally to the central axis $A_c$ within the first slot 414 and the second slot 428. When the selectable clamp 102 is in an open position, as shown in FIG. 6C, the plurality of screws 416 are positioned distally to the central axis $A_c$ within the first slot 414 and the second slot 428.

Now referring specifically to FIG. 6C, is the selectable clamp 102 in a closed position. When the selectable clamp 102 is in a closed position, the first pin 530 is engaged with the first front clamp plate hook 411 and the first rear clamp plate hook 507.

The latch further includes a fourth pin 608. The fourth pin 608 is fixedly coupled to the second front clamp plate 424 and the second rear clamp plate 508 within the second latch opening 432. The fourth pin 608 is positioned between the first pin 530 and the second pin 532. The fourth pin 608 is configured to couple the latch 408 to the selectable clamp 102. For example, the fourth pin 608 may be positioned within the latch 408 such that the fourth pin 608 may not be seen when looking along the central axis $A_c$.

Further, when in a closed position, the release lever 540 is in contact with each of the second front clamp plate 424 and the second rear clamp plate 508 to prevent the selectable clamp 102 from opening unnecessarily (e.g., unintentionally, etc.).

As shown in FIG. 6C, when the selectable clamp 102 is in the closed position the plurality of screws 416 are positioned on a distal end of each of the first slot 414 and the second slot 428 with respect to the central axis $A_c$.

FIGS. 7-10 illustrates the selectable clamp 102 and the first weight set 116 of the selectable barbell clamp system 100 down the longitudinal axis $A_c$. As shown in FIGS. 7-10, the selectable clamp 102 and the first weight set 116 are placed in the first weight rack 110. Now specifically referring to FIG. 7, the selectable clamp 102 and the first weight set 116 are placed in the first weight rack 110 and the selectable clamp 102 is in a closed position.

Figure 7:
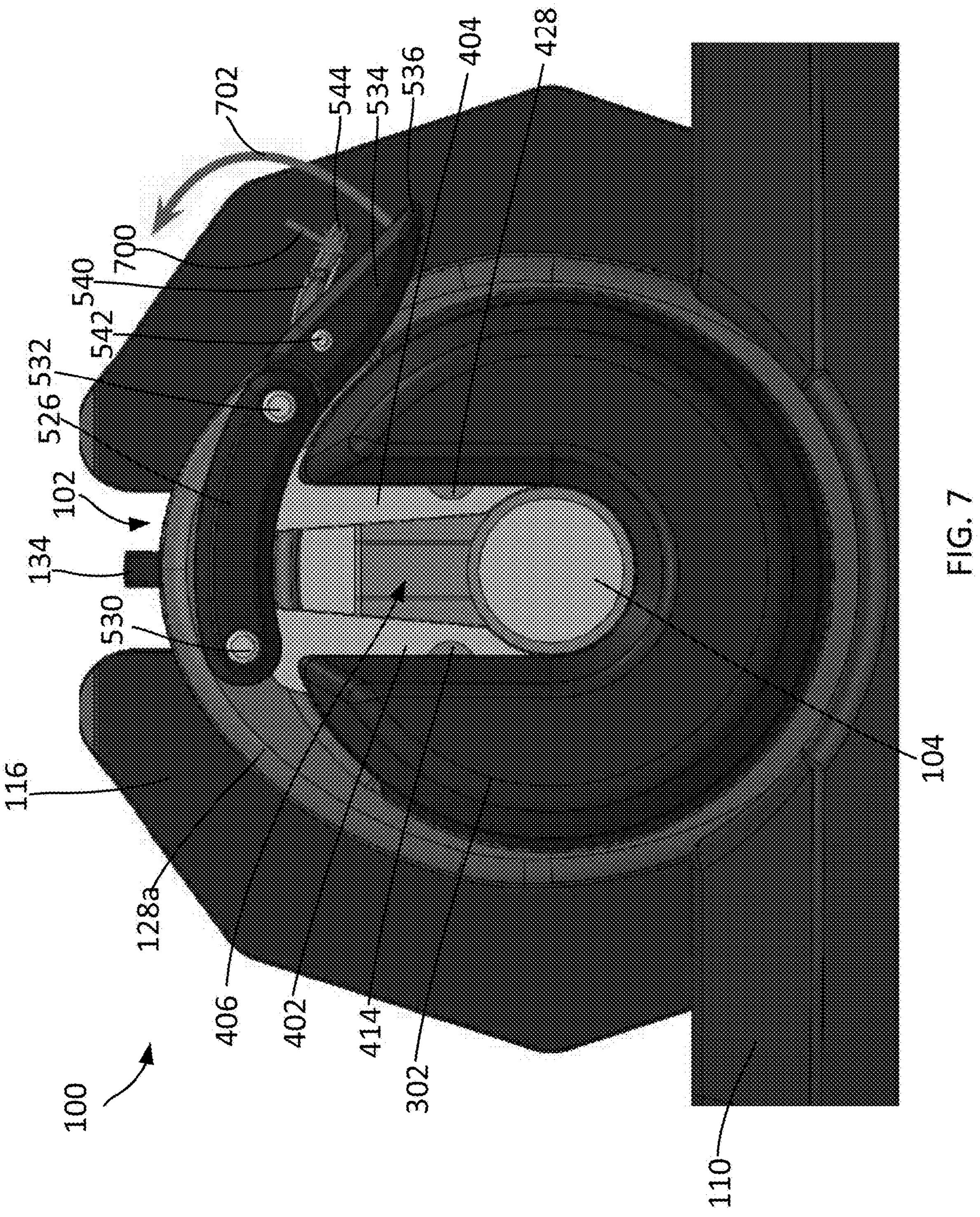
FIG. 7 is a front view of the selectable barbell clamp in a closed and locked position according to the embodiment of FIG. 1.

As shown in FIG. 7, to release (e.g., un-lock etc.) the selectable clamp 102, the user pushes downwards on the second part 534 of the latch 408 and on the release tab 544 of the release lever 540 as shown by arrow 700. Then the user pulls upward on the tapered end 536 of the second part 534 as shown by arrow 702. As the user pulls upward, the selectable clamp 102 is unlocked (e.g., able to be released, etc.)

Figure 8:
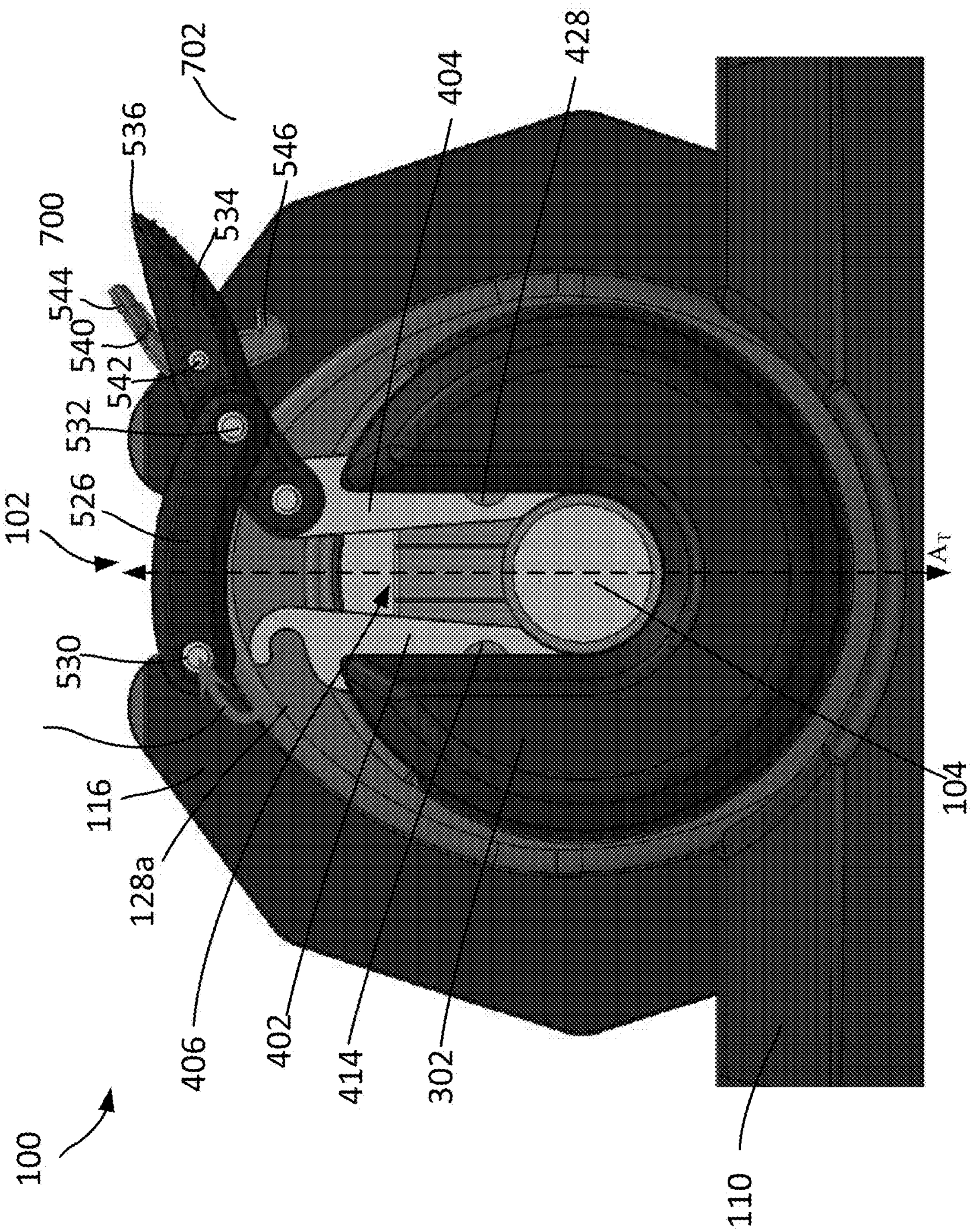
FIG. 8 is a front view of the selectable barbell clamp in an open position with the barbell engaged according to the embodiment of FIG. 1.
Figure 9:
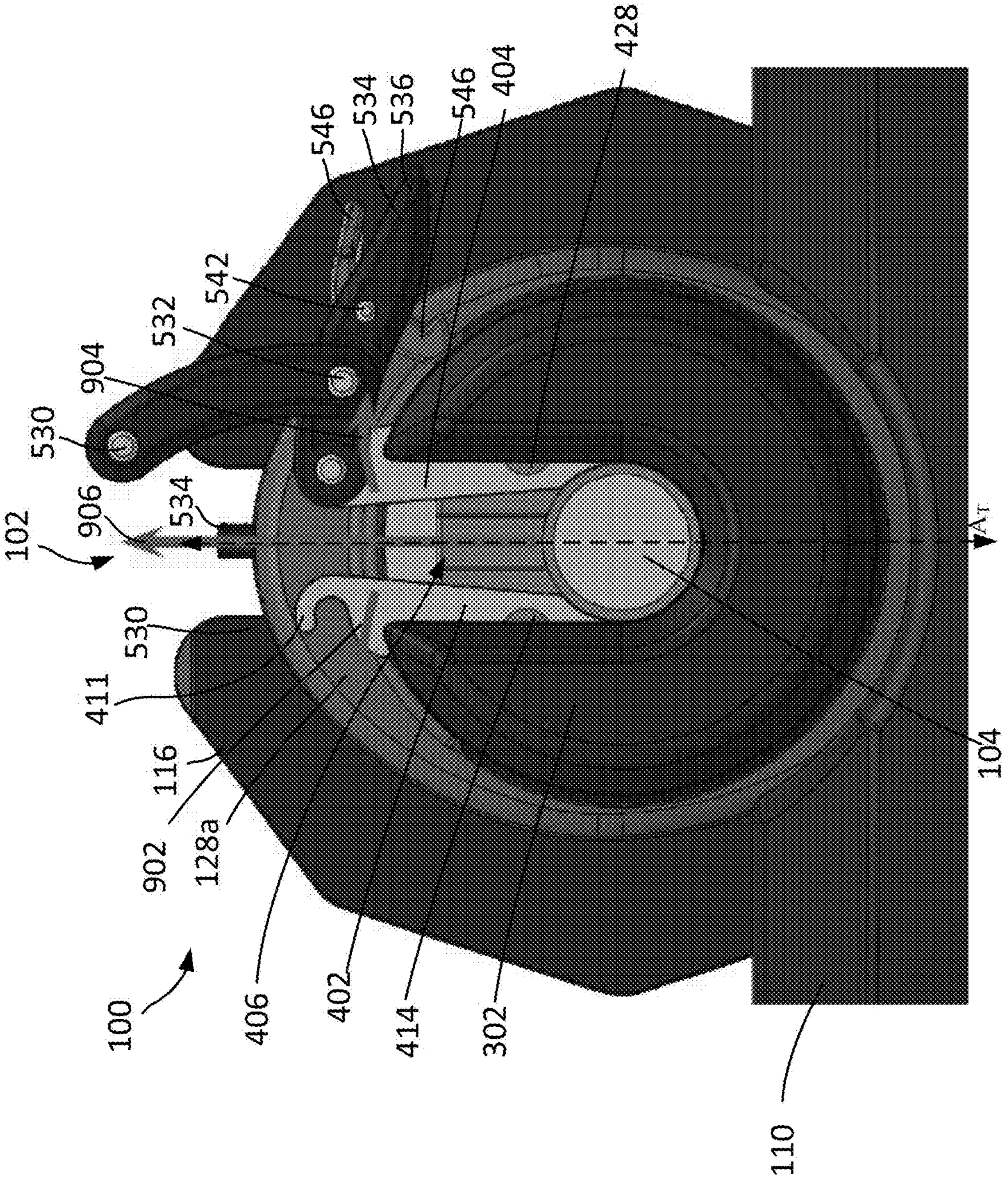
FIG. 9 is another front view of the selectable barbell clamp in an open position with the barbell engaged according to the embodiment of FIG. 1.

FIGS. 8-9 illustrate releasing of the latch 408 of the selectable clamp 102 for the selectable barbell clamp system 100. The release lever 540 and the second part 528 of the latch 408 have been pressed downward (e.g., by the user) to unlock the latch 408 from the second clamp plate set 404. First, the user must remove (e.g., displace, unlatch, etc.) the first pin 530 from each of the first front clamp plate hook 411 and the first rear clamp plate hook 507. For example, as shown by a looped arrow 800, the first pin 530 moves laterally out of the first front clamp plate hook 411 and the first rear clamp plate hook 507 with respect to a transverse axis $A_T$ of the selectable clamp 102. The first pin 530 of the latch 408 then moves and upward above the first front clamp plate hook 411 and the first rear clamp plate hook 507 to release the selectable clamp 102 and open the expandable opening 406.

Once the first pin 530 and the first part 526 of the latch 408 has cleared the expandable opening 406, the weightlifting handlebar 104 can be removed. The weightlifting handlebar 104 is moved vertically upward as shown by a vertical arrow 900. For example, the weightlifting handlebar 104 is moved vertically a distance upward past the latch 408.

Further, as the weightlifting handlebar 104 moves out of the expandable opening 406, The weightlifting handlebar 104 disengages with each of the first clamp plate set 402 and the second clamp plate set 404. For example, the weightlifting handlebar 104 releases downward presses on each of the first clamp jaw 420 and the second clamp jaw 515. The first clamp plate set 402 and the second clamp plate set 404 then move outward relative to the transverse axis $A_T$. For example, the first clamp plate set 402, moves laterally a first direction 902, which the second clamp plate set 404 moves a second direction 904, opposite the first direction 902. As the first clamp plate set 402 moves in the first direction 902 and the second clamp plate set 404 moves in the second direction 904, the expandable opening 406 widens (e.g., expands, enlarged, etc.). The weightlifting handlebar 104 can then be removed from the selectable clamp 102 by pulling the weightlifting handlebar 104 upward as shown by arrow 906.

Figure 10:
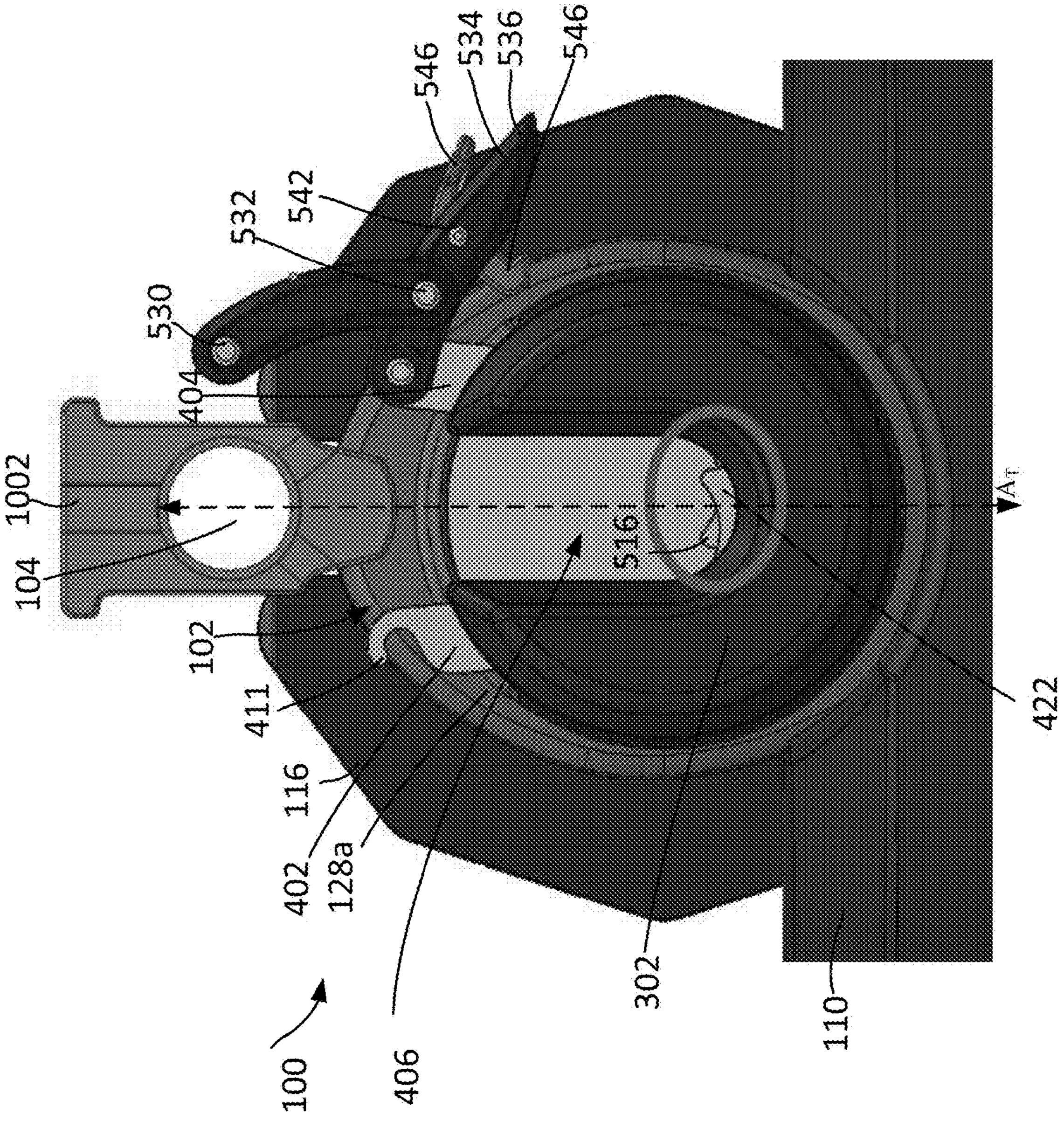
FIG. 10 is a front view of selectable barbell clamp of the selectable barbell clamp in an open position with the barbell disengaged according to the embodiment of FIG. 1.

FIG. 10 illustrates the weightlifting handlebar 104 disengaged with the selectable clamp 102. As shown in FIG. 10, when the selectable clamp 102 is in an open position and the weightlifting handlebar 104 has been removed, the first clamp jaw 420 and the second clamp jaw 514 protrude (e.g., extend, etc.) into the lower portion 604 of the expandable opening 406. For example, when the weightlifting handlebar 104 engages with each of the first clamp jaw 420 and the second clamp jaw 514, the first clamp plate set 402 and the second clamp plate set 404 are forced to pivot inward towards the transverse axis $A_T$.

Figure 11B:
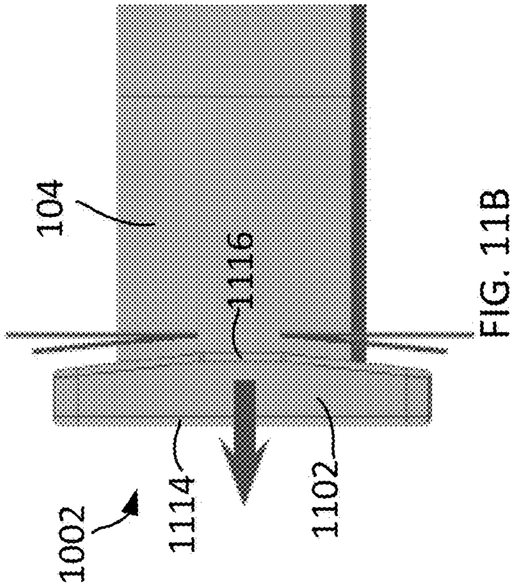
FIG. 11B is a top down view of the barbell according to the embodiment of FIG. 11A.
Figure 11A:
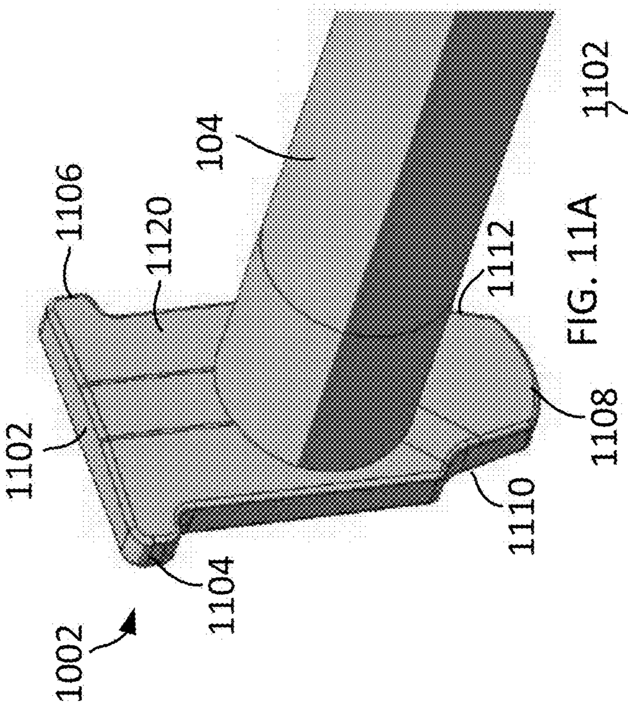
FIG. 11A is a perspective view of a back side of a barbell according to one embodiment.
Figure 11C:
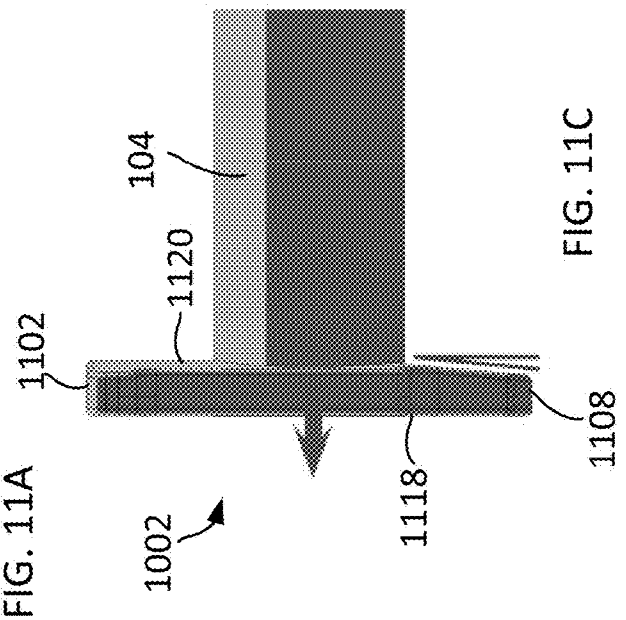
FIG. 11C is a side view of the barbell according to the embodiment of FIG. 11A.

FIGS. 11A-11C illustrates the weightlifting handlebar 104 including the end piece 1002 for a selectable barbell clamp system 100. The weightlifting handlebar 104 includes a first end piece 1002 and a second end piece (not shown). The end piece 1002 is removably coupled to the selectable clamp 102. For example, the user may select a weightlifting handlebar 104 and place the first end piece 1002 in a first selectable clamp 102*a* and the second end piece in a second selectable clamp 102*b*.

FIG. 11A is a perspective view of the end piece 1002. A central portion of the end piece 1002 is coupled (e.g., welded, etc.) to the weightlifting handlebar 104. The end piece 1002 includes a top edge 1102. The top edge 1102 is substantially flat. The top edge 1102 includes a first tab 1104 and a second tab 1106. The first tab 1104 is on a first side of the end piece 1002 and the second tab 1106 is positioned on a second side of the end piece 1006 opposite the first tab 1104.

The end piece 1002 further includes a bottom edge 1108, a first curved edge 1110, and a second curved edge 1112. The bottom edge 1108 is positioned opposite the top edge 1102 and below the weightlifting handlebar 104. The first curved edge 1110 is positioned on the first side of the end piece 1002 and the second curved edge 1112 is positioned opposite of the first curved edge 1110 on the second side of the end piece 1002. The bottom edge 1108 is configured to engage with each of the first clamp jaw 420 and the second clamp jaw 514.

FIG. 11B is a top view of the end piece 1002, illustrating the top edge 1102. The top edge 1102 includes a distal end 1114 and the proximal end 1116. The distal end 1114 is a flat (e.g., a straight edge, etc.). The distal end 1114 is in contact with the back plate 436 when the end piece 1002 is engaged with the selectable clamp 102.

The proximal end 1116 protrudes outward at an angle relative to a plane A-A defined by the distal end 1114 that bisects the weightlifting handlebar 104. For example, proximal end 1116 extends outward from each of the first tab 1104 and the second tab 1106 toward the weightlifting handlebar 104. The proximal end 1116 is configured to prevent any movement (e.g., proximally or distally, up or down, left or right, etc.) of the end piece 1002 between the first front clamp plate 410, the second front clamp plate 424, the first rear clamp plate 502, and the second rear clamp plate 508. For example, the proximal end 1116 is configured to wedge (e.g., tightly fit, securely fit, etc.) between each of the first front clamp plate 410 and the first rear clamp plate 502, and the second front clamp plate 424 and the second rear clamp plate 508 to prevent the movement to the end piece 1002 in any direction within the selectable clamp 102. Specifically, the angle the angle at which the proximal end 1116 extends outward at may prevent movement of the end piece 1002 along the central axis $A_c$ when the selectable clamp 102 is in a closed position.

FIG. 11C is a side view of the end piece 1002. The end piece 1002 includes a front face 1118 and a rear face 1120. The front face 1118 is flat (e.g., planar, etc.). The front face is configured to be in confronting relation with the back plate 436 when the end piece 1002 is engaged with the selectable clamp 102. The rear face 1120 is flat (e.g., planar, etc.) above the point of attachment of the weightlifting handlebar 104. Below the point of attachment of the weightlifting handlebar 104, the rear face 1120 is slanted (e.g., tapered, etc.) as the rear face 1120 extends to the bottom edge 1108.

Figure 12:
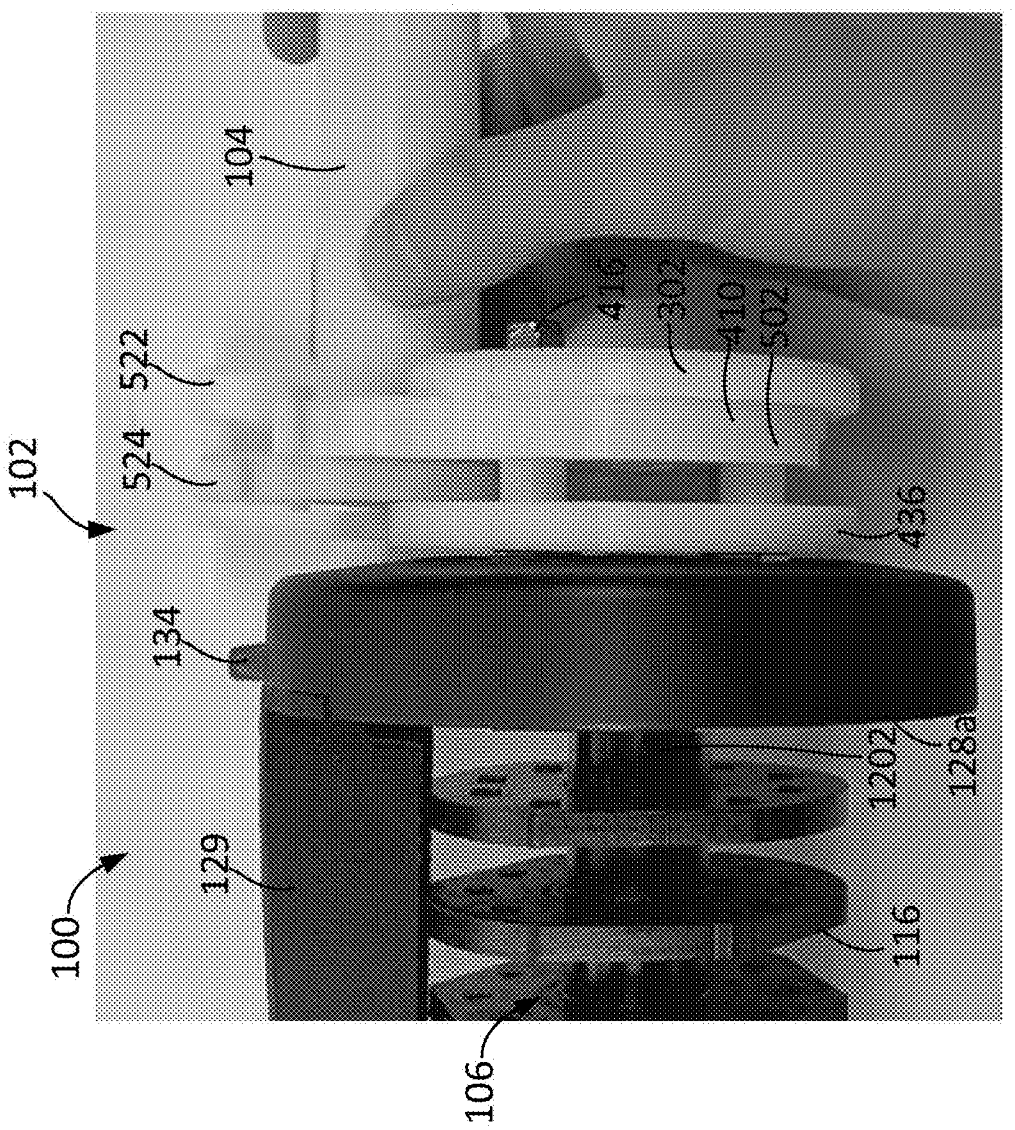
FIG. 12 is a side view of the insertion of the barbell into the selectable barbell clamp and barbell according to the embodiment of the selectable barbell system of FIG. 1.
Figure 13:
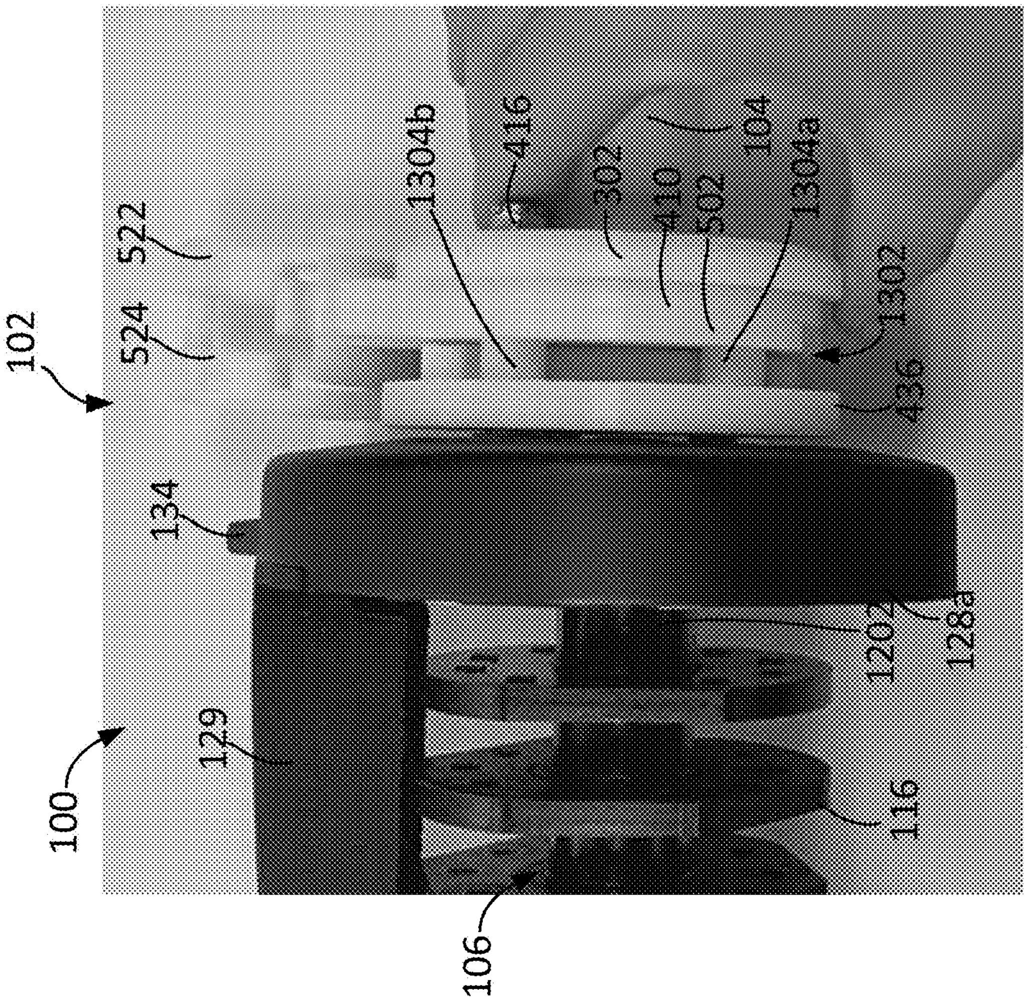
FIG. 13 is another side view of the insertion of the barbell into the selectable barbell clamp according to the embodiment of FIG. 12.

Now referring to FIGS. 12-13, side views are shown of the selectable clamp 102 for a weightlifting handlebar system 100 including the end piece 1002 of the weightlifting handlebar 104, the proximal housing end 128, and the selectable clamp 102. The proximal housing end 128 of the first weight housing 125 is shown coupled to the coupling portion 129. The coupling portion 129 is attached to a top portion of the proximal housing end 128. The plurality of selectable weights 106 are a portion of the first weight set 116 and are shown below the coupling portion 129. The plurality of selectable weights 106 are coupled to the weight housing 125 via any form of attachment (e.g., selectively attached, removably attached, etc.). For example, the weight housing 125 may include a rod 1202 extending from the proximal housing end 128 to the distal housing end 127. The rod 1202 may be configured to selectively attach the plurality of selectable weights 106 to the weight housing 125.

The proximal housing end 128 is adjacent to (e.g., in confronting relation to, etc.) the back plate 436. The back plate 436, the first rear clamp plate 502, and the second rear clamp plate 508 define an end piece cavity 1302. The end piece cavity 1302 is configured to receive the end piece 1006 of the weightlifting handlebar 104.

The selectable clamp 102 further includes a plurality of bushings 1304. The plurality of bushings 1304 extend from the back plate 436 through each of the first rear clamp plate 502, the first front clamp plate 410, the second rear clamp plate 508, the second front clamp plate 424, and the front plate 600. The plurality of bushings 1304 are configured to receive the plurality of screws 416 coupling the first clamp plate set 402 and the second clamp plate set 404 to each of the back plate 436 and the front plate 600.

The plurality of bushings 1304 includes a lower bushings 1304*a* and upper bushings 1304*b*. The lower bushings 1304*a* are positioned on a bottom half of the back plate 436. The upper bushings 1304*b* are positioned on a top half of the back plate 436 above the lower bushings 1304*a*.

FIG. 13 illustrates the selectable clamp 102 with the end piece 1006 positioned within the end piece cavity 1302. Once the end piece 1006 is fully inserted into the end piece cavity 1302, the first curved edge 1110 and the second curved edge 1112 engage with the lower bushings 1304*a*. For example, the first curved edge 1110 and the second curved edge 1112 with rest against (e.g., contact, etc.) the lower bushings 1304*a* when the end piece 1006 is placed properly within the end piece cavity 1302 of the selectable clamp 102.

Further, when the end piece 1002 is fully engaged with the selectable clamp 102, each of the first tab 1104 and the second tab 1106 are engaged with the upper bushings 1304*b*. For example, the first tab 1104 and the second tab 1106 can rest on a top edge of the upper bushings 1304*b*. The lower bushings 1304*a* engaging with each of the first curved edge 1110 and the second curved edge 1112 and the upper bushings engaging with each of the first tab 1104 and the second tab 1106 aid in guiding the end piece 1006 properly into the end piece cavity 1302.

Figure 14:
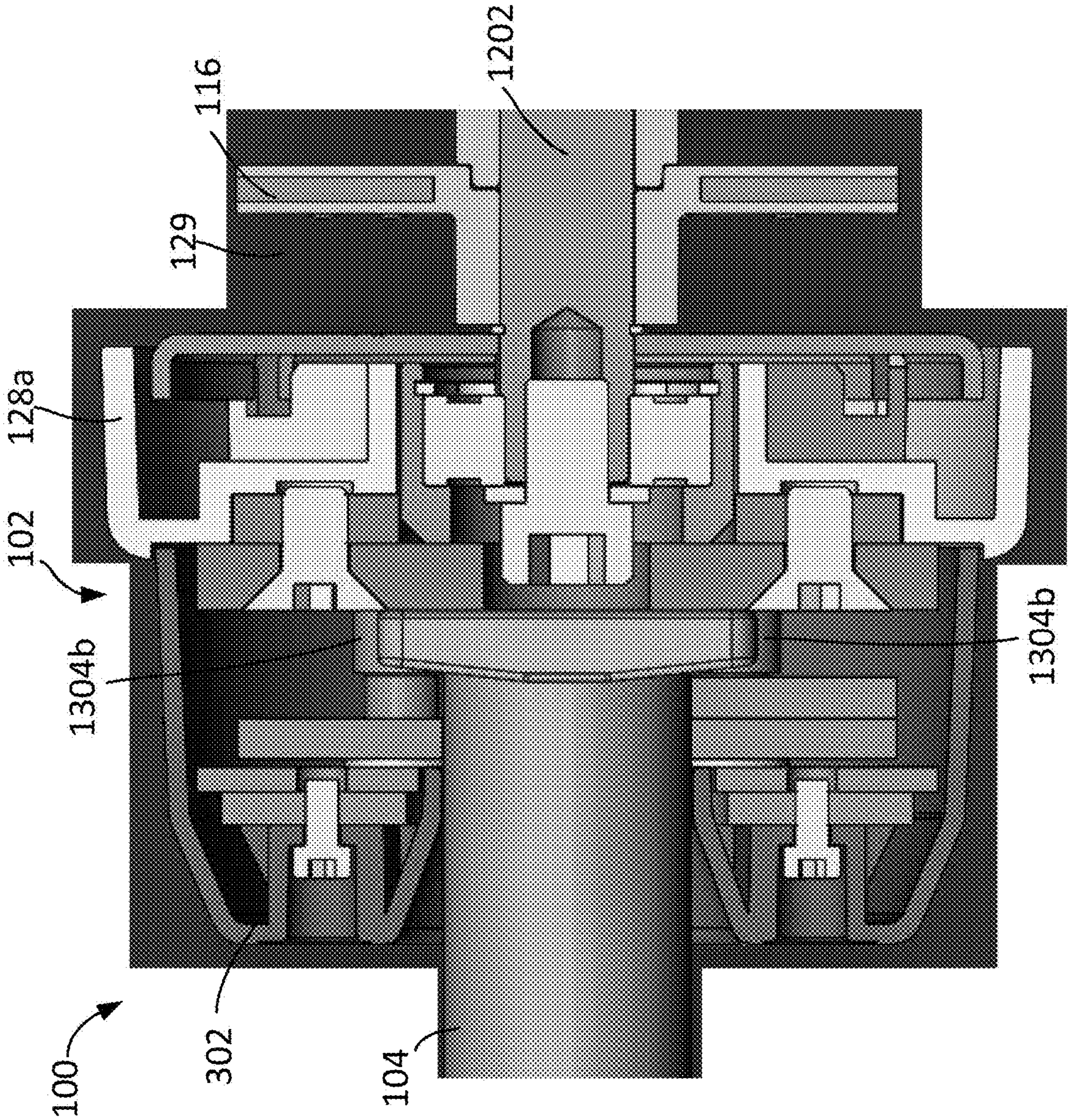
FIG. 14 is a top down cross-sectional view of the selectable barbell clamp according to the embodiment of FIG. 1.
Figure 15:
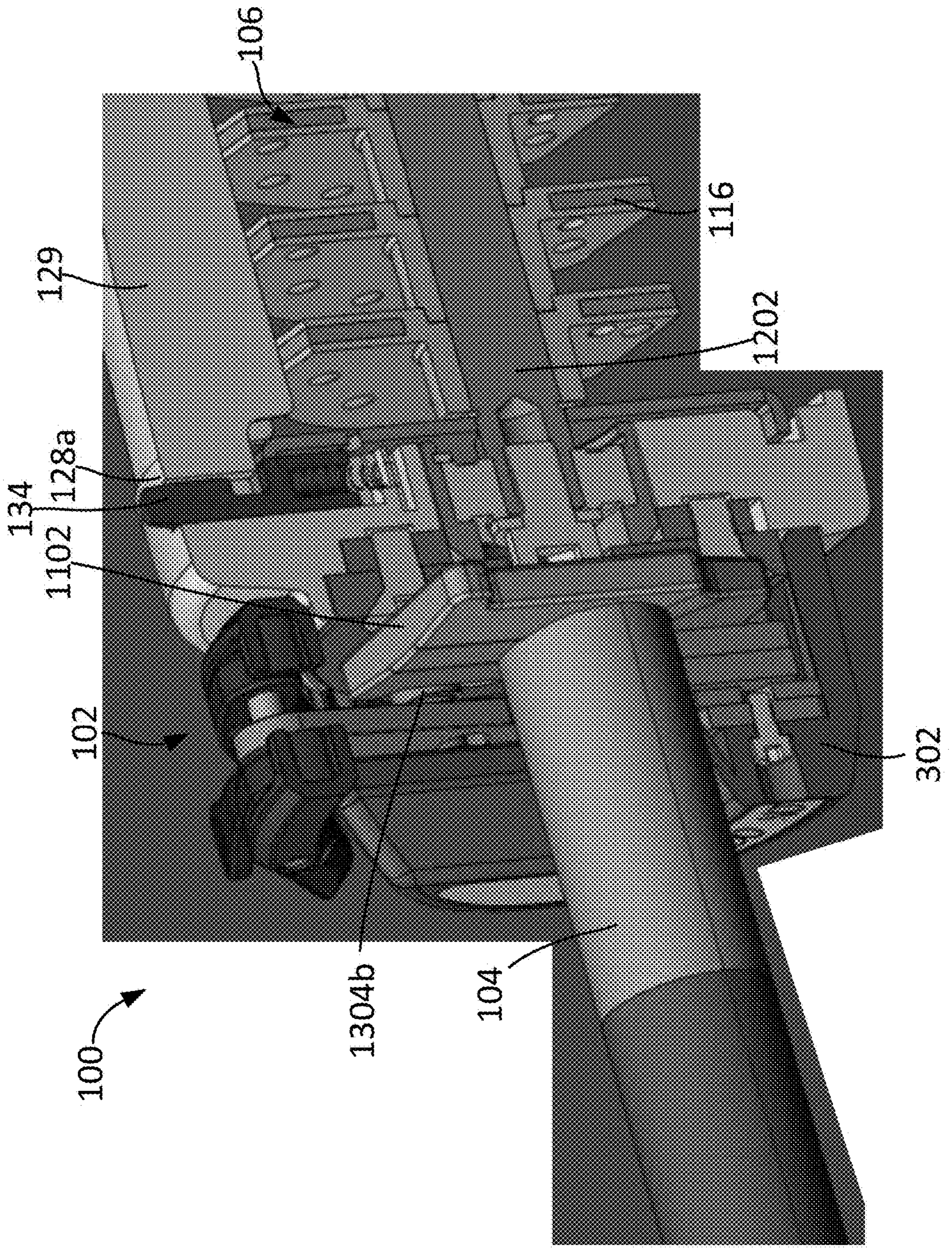
FIG. 15 is a side cross-sectional view of the selectable barbell clamp according to the embodiment of FIG. 1.

FIG. 14 shows a top cross-sectional view of the selectable clamp for a weightlifting handlebar system 100 including the end piece 1002 of the weightlifting handlebar 104, the proximal housing end 128, and the selectable clamp 102. FIG. 15 illustrates a side cross-sectional view of the selectable clamp 102 engaged with the end piece 1006 of the weightlifting handlebar 104. As shown in FIGS. 14-15, each of the first tab 1104 and the second tab 1106 are rest on the top edge of the upper bushings 1304*b*. Further, the front face 1118 is flush with the back plate 436. For example, front face 1118 of the end piece 1006 is touching at least a portion of the back plate 436.

Figure 16:
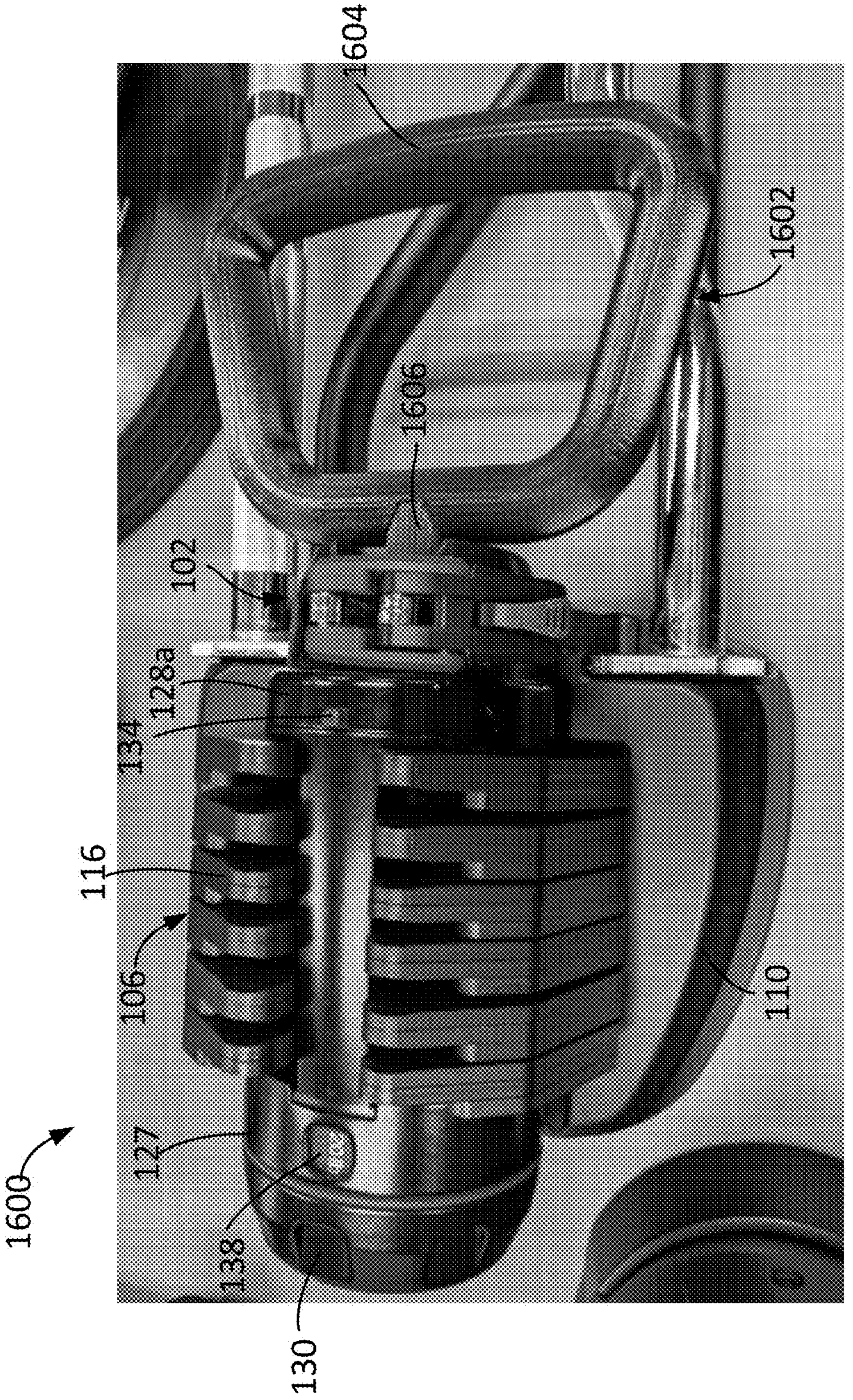
FIG. 16 is a top perspective view of a selectable barbell clamp system for a kettlebell according to one embodiment.
Figure 17:
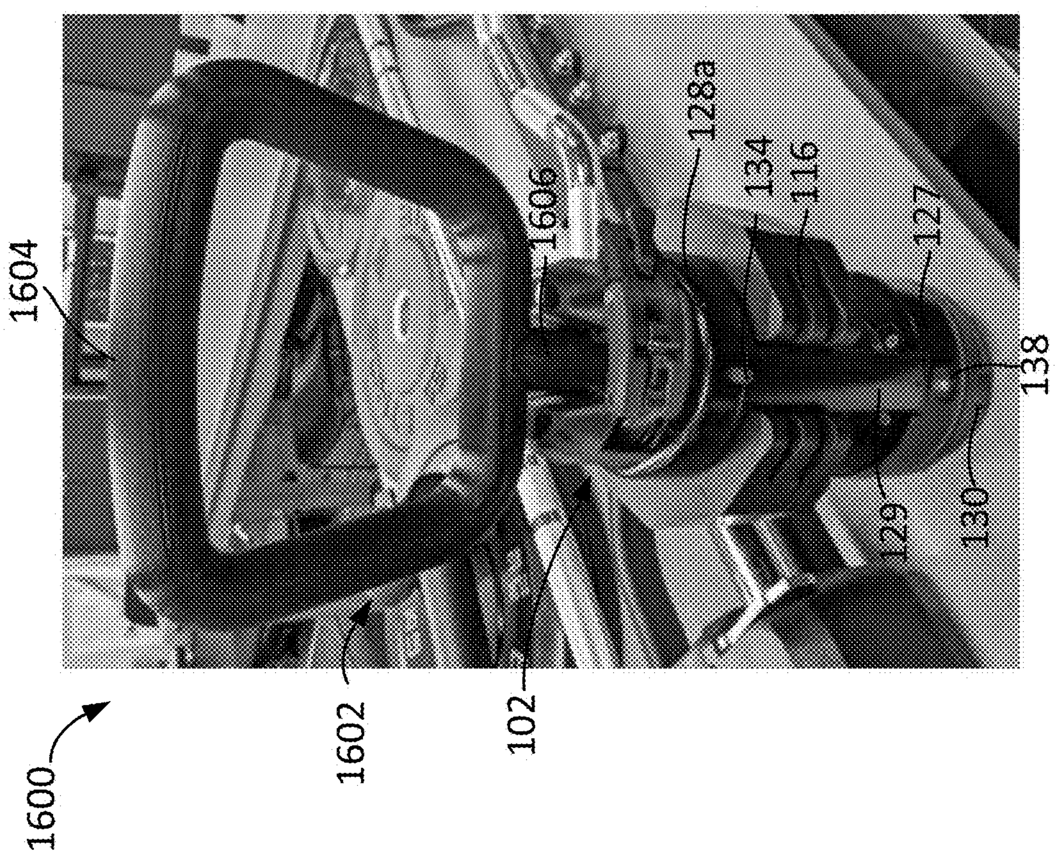
FIG. 17 is a front view of the selectable barbell clamp system for the kettlebell according to the embodiment of FIG. 16.
Figure 18:
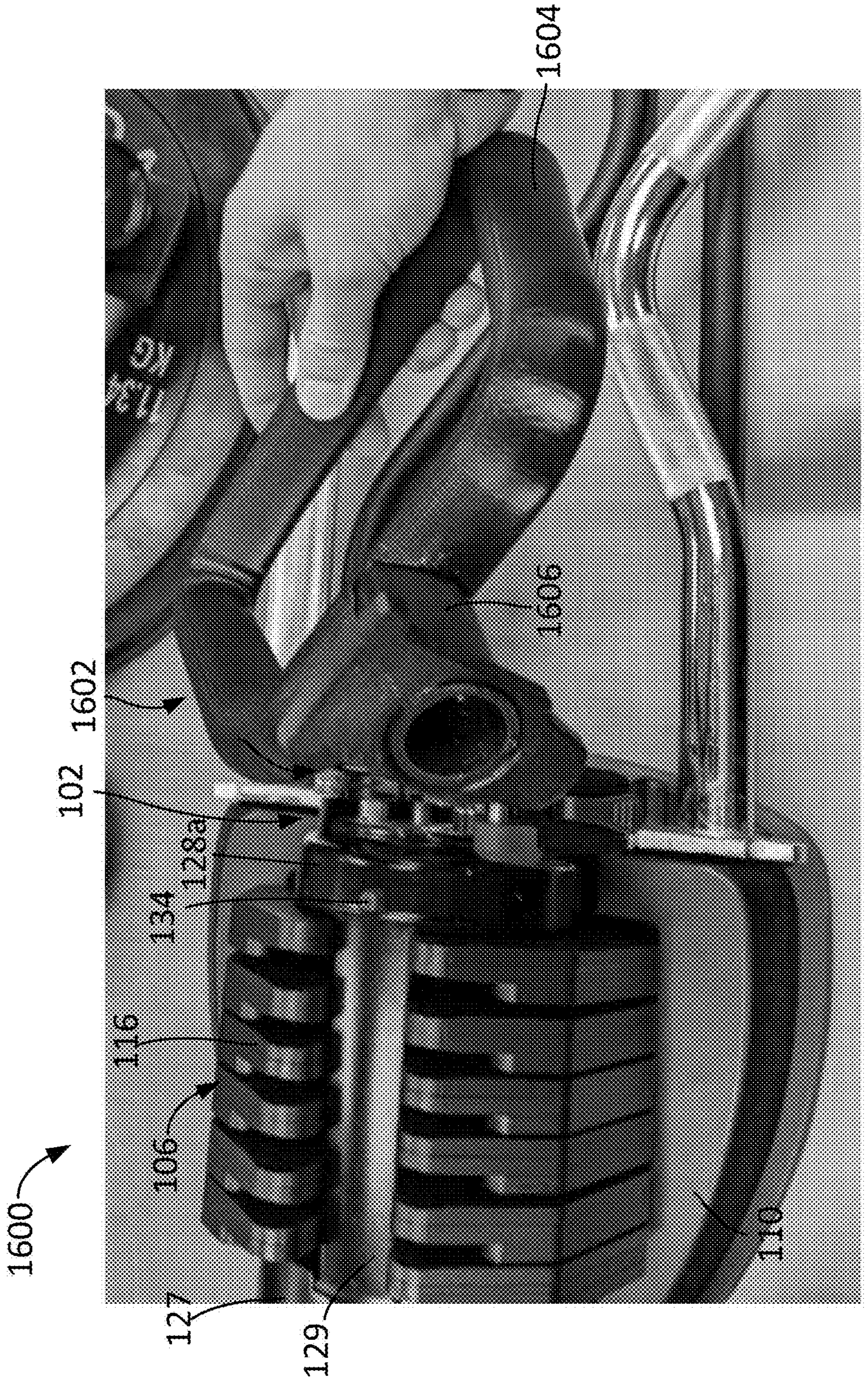
FIG. 18 is a top perspective view of the selectable barbell clamp system for the kettlebell according to the embodiment of FIG. 16.

Now referring to FIGS. 16-18, a selectable clamp for a weightlifting handlebar system 1600 according to another embodiment. According to this embodiment, the selectable barbell system 1600 includes the selectable clamp 102, the plurality of selectable weights 106, the first weight set 116, and the first weight housing 125. This embodiment of the selectable clamp system 100 includes a kettlebell weightlifting handlebar 1602. The kettlebell weightlifting handlebar 1602 includes a closed loop handle 1604, a short straight bar portion 1606, and the end piece 1006. The short straight bar portion 1606 is coupled to each of the closed loop handle 1604 and the end piece 1006.

As shown in FIG. 17, is the selectable clamp system 1600 including the kettlebell weightlifting handlebar 1602. The kettlebell weightlifting handlebar 1602 is configured to be used with a single weight set, such as the first weight set 116 or the second weight set 118. For example, a second bar (e.g., a second kettlebell weightlifting handlebar) may be used with the second weight set 118 while the first weight set 118 is used with the kettlebell weightlifting handlebar 1602.

As shown in FIG. 18, the kettlebell weightlifting handlebar 1602 includes the end piece 1002. For example, the end piece 1002 is structurally equivalent on each of the first weightlifting handlebar 104*a* (e.g., straight bar), the second weightlifting handlebar 104*b* (e.g., the curl bar), and the kettlebell weightlifting handlebar 1602. Other weightlifting handlebars 104 (e.g., dumbbell handle, etc.) may also include the same end piece 1002. The similar end piece 1002 allows the selectable clamp 102 to be compatible with a variety of different weightlifting handlebars and allows the weightlifting handlebar system 1600 to be used for a variety of different exercises. For example, the user may couple the kettlebell weightlifting handlebar 1602 to the adjustable weight set (e.g., the first weight set 116) to perform a first weightlifting exercise. The user may then uncouple the weightlifting handlebar 1602 and couple a different weightlifting handlebar, such as the straight bar 104*a* to the adjustable weight set and perform a second weightlifting exercise.

According to any illustrated embodiment described herein, a method of interchanging weightlifting handlebars 104 on an adjustable weight set (e.g., the first weight set 116 and/or the second weight set 118) using a selectable clamp 102 includes at least one or more of the steps: (1) opening a first clamp 102*a* (e.g., releasing a first latch 408) on a first end of the adjustable weight set (e.g., the first weight set 116) to disengage a first end (e.g., the first end piece 1002) of a weightlifting handlebar 104, (2) opening a second clamp 102*b* (e.g., releasing a second latch 408) on a second end of the adjustable weight set (e.g., the second weight set 118) to disengage a second end of the weightlifting handlebar 104, (3) removing the weightlifting handlebar 104 from the first clamp 102*a* and the second clamp 102*b*, (4) inserting another weightlifting handlebar (e.g., the curl bar weightlifting handlebar 104*b*, the kettlebell weightlifting handlebar 1602, etc.) into the first clamp 102*a* and the second clamp 102*b*, (5) closing the first clamp 102*a* (e.g., securing the first latch) on the first end of the adjustable weight set to engage a first end of the other weightlifting handlebar 104, and (6) closing the second clamp 102*b* (e.g., securing the second latch 408) on the second end of the adjustable weight set to engage a second end of the other weightlifting handlebar 104. The step of opening the first clamp 102*a* may include opening a first latch 408 on the first clamp 102*a*, and the step of opening the second clamp 102*b* may include opening a second latch 408 on the second clamp 102*b*. The step of inserting another weightlifting handlebar 104 may include engaging projections (e.g., the first projection 422, and the second projection 516) on the clamp plates (e.g., the first front clamp plate 410, and the second rear clamp plate 508) and pivoting the clamp plates from an open position to a closed position. The method may also include the steps of closing the first latch 408 on the first clamp 102*a* and closing the second latch 408 on the second clamp 102*b*, where closing the first latch 408 on the first clamp 102*a* and closing the second latch 408 on the second clamp 102*b* further includes the step of radially gripping the weightlifting handlebar 104 between the clamp plates. The step of closing the first latch 408 on the first clamp 102*a* and closing the second latch 408 on the second clamp 102*b* may also include axially wedging the first end (e.g., the first end piece 1002) of the weightlifting handlebar within the first clamp 102*a*, and axially wedging the second end (e.g., end piece 1002) of the weightlifting handlebar 104 within the second clamp 102*b*. According to any embodiment, the method of the present disclosure is intended for use with a weightlifting handlebar 104 that may be at least one of a straight-bar 104*a*, a curl-bar 104*b*, a kettlebell handle 1602, and a barbell handle.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the systems and methods of the selectable clamp for a weightlifting handlebar for an adjustable weight set as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Other substitutions, modifications, changes and omissions may also be made in the design, operating conditions and arrangement of the various exemplary embodiments without departing from the scope of the present invention. For example, any element (e.g., selectable clamp, weightlifting handlebar, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A weightlifting handlebar assembly comprising:

a kettlebell weightlifting handlebar comprising:

a loop handle, and an end piece coupled to the loop handle;

a clamp comprising:

a first clamp plate set and a second clamp plate set pivotally movable relative to each other and defining an expandable opening therebetween configured to engage the end piece in a closed position and disengage the end piece in an open position; and a latch releasably coupled to the first clamp plate set and the second clamp plate set to secure the kettlebell weightlifting handlebar in the closed position and to release the kettlebell weightlifting handlebar in the open position.

2. The weightlifting handlebar assembly of claim 1, wherein:

the first clamp plate set comprises a first front clamp plate and a first rear clamp plate, each of the first front clamp plate and the first rear clamp plate having:

a first pivot point, a first slot, and a first latch opening positioned above the first slot on an outer edge;

the first front clamp plate includes a first clamp jaw positioned on an inner edge between the first pivot point and the first slot; and the first front clamp plate includes a first projection positioned below the first clamp jaw.

3. The weightlifting handlebar assembly of claim 2, wherein:

the second clamp plate set is positioned opposite the first clamp plate set, and comprises a second front clamp plate and a second rear clamp plate, each of the second front clamp plate and the second rear clamp plate having:

a second pivot point, a second slot, and a second latch opening positioned above the second slot;

the second rear clamp plate includes a second clamp jaw positioned on an inner edge between the second pivot point and the second slot; and the second rear clamp plate includes a second projection positioned below the first clamp jaw.

4. The weightlifting handlebar assembly of claim 3, wherein the latch is configured to engage the first latch opening and the second latch opening and is operable between a latched state where the first clamp jaw and the second clamp jaw are drawn inward to a clamped position and a released state where the first clamp jaw and the second clamp jaw are extended outward to a released position.

5. The weightlifting handlebar assembly of claim 4, wherein the first clamp jaw is pivotable about the first pivot point and the second clamp jaw is pivotable about the second pivot point to define at least a portion of the expandable opening to clamp the kettlebell weightlifting handlebar in the latched state.

6. The weightlifting handlebar assembly of claim 4, wherein the first projection and the second projection pivotally extend at least partially into the expandable opening in the released state.

7. The weightlifting handlebar assembly of claim 4, wherein in the released state each of the first clamp jaw and the second clamp jaw protrudes into the expandable opening.

8. The weightlifting handlebar assembly of claim 7, wherein a portion of a handlebar engages with each of the first clamp jaw and the second clamp jaw causing the first clamp plate set and the second clamp plate set to pivot inward towards a transverse axis of the clamp.

9. The weightlifting handlebar assembly of claim 4, wherein when the clamp is in the closed position and the latch is in the latched state, a first distance between the first clamp plate set and the second clamp plate set adjacent to the latch is less than a second distance between the first clamp plate set and the second clamp plate set adjacent to the first clamp jaw and the second clamp jaw.

10. The weightlifting handlebar assembly of claim 9, wherein:

when the clamp is in a released state where the first clamp jaw and second clamp jaw are extended outward to a released position, the first distance between the first clamp plate set and the second clamp plate set adjacent to the latch is greater than the second distance between the first clamp plate set and the second clamp plate set adjacent to the first clamp jaw and the second clamp jaw.

11. The weightlifting handlebar assembly of claim 10, wherein the first clamp plate set pivots counterclockwise to the released state and the second clamp plate set pivots clockwise to the released state.

12. The weightlifting handlebar assembly of claim 3, further comprising a back plate spaced behind the first clamp plate set and the second clamp plate set by a predetermined dimension to receive an end plate on the kettlebell weightlifting handlebar.

13. The weightlifting handlebar assembly of claim 12, further comprising a front plate having a U-shaped opening in registry with the expandable opening, disposed in front of the first clamp plate set and the second clamp plate.

14. The weightlifting handlebar assembly of claim 13, further comprising a first fastener and bushing assembly extending through the first pivot point, and a second fastener and bushing assembly extending through the first slot, and a third fastener and bushing assembly extending through the second pivot point, and a fourth fastener and bushing assembly extending through the second slot.

15. The weightlifting handlebar assembly of claim 14, wherein the first fastener and bushing assembly and the second fastener and bushing assembly are configured to secure the back plate, the first clamp plate set, the second clamp plate set, and the front plate set together in alignment with an axis of the expandable opening.

16. The weightlifting handlebar assembly of claim 14, wherein the end piece is further, comprising:

comprising a first tab and a second tab, the first tab and the second tab configured to engage with the first fastener and bushing assembly and the second fastener and bushing assembly.

17. The weightlifting handlebar assembly of claim 16, further comprising:

a weight housing, the weight housing coupled to each of the first clamp plate set and the second clamp plate set; and a weight button positioned on the weight housing, the weight button configured to selectively couple one or more weight plates to the handlebar.

18. The weightlifting handlebar assembly of claim 3, wherein the latch is an over-center latch and at least one of the first latch opening or the second latch opening comprises a hook.

19. The weightlifting handlebar assembly of claim 3, wherein the latch comprises a first part comprising a first pin, the first part is configured to selectively engage the first latch opening and the second latch opening, the first part extending across the expandable opening.

20. The weightlifting handlebar assembly of claim 19, wherein the latch comprises:

a second part comprising:

a second pin coupling the second part to the second latch opening, a third pin coupled to a release lever, the release lever positioned through the second part and configured to engage with the first clamp plate set and rotate about the third pin, and a joint positioned between the second pin and the third pin coupling the first part to the second part.

21. The weightlifting handlebar assembly of claim 20, wherein the second part of the latch comprises a tapered end configured to move the first part a lateral distance to selectively couple and uncouple the first part from the first latch opening to release the clamp.

22. The weightlifting handlebar assembly of claim 20, wherein the release lever comprises a tab positioned above the second part, the tab configured to release the release lever from the second clamp plate set.

23. The weightlifting handlebar assembly of claim 22, wherein the release lever comprises a hook positioned below the second part and in contact with the second clamp plate set, the hook is configured to engage the second clamp plate set to bias the latch to a latched state.

24. The weightlifting handlebar assembly of claim 3, wherein each of the first projection and the second projection extends across a central axis of the clamp, and the second projection overlapping a portion of the first projection.

25. The weightlifting handlebar assembly of claim 3, wherein each of the first pivot point and the second pivot point are positioned on a lower half of the first front clamp plate and the second front clamp plate, respectively, when looking down a longitudinal axis of the clamp.

26. The weightlifting handlebar assembly of claim 3, wherein each of the first slot and the second slot are positioned on an upper half of the first front clamp plate and the second front clamp plate, respectively, when looking down a longitudinal axis of the clamp.

27. The weightlifting handlebar assembly of claim 2, further comprising a front clamp plate cover coupled to the first front clamp plate.

* * * * *